US011693428B2

United States Patent
Li et al.

(10) Patent No.: US 11,693,428 B2
(45) Date of Patent: Jul. 4, 2023

(54) METHODS AND SYSTEM FOR AUTONOMOUS LANDING

(71) Applicant: SZ DJI TECHNOLOGY CO., LTD., Shenzhen (CN)

(72) Inventors: Peiliang Li, Shenzhen (CN); Xuyang Feng, Shenzhen (CN); Cong Zhao, Shenzhen (CN); Jie Qian, Shenzhen (CN); You Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/457,810

(22) Filed: Dec. 6, 2021

(65) Prior Publication Data
US 2022/0091618 A1   Mar. 24, 2022

Related U.S. Application Data

(63) Continuation of application No. 16/285,388, filed on Feb. 26, 2019, now Pat. No. 11,194,344, which is a
(Continued)

(51) Int. Cl.
*G05D 1/04* (2006.01)
*G05D 1/06* (2006.01)
(Continued)

(52) U.S. Cl.
CPC .......... *G05D 1/042* (2013.01); *B64C 39/024* (2013.01); *G05D 1/0676* (2013.01); *B64U 70/00* (2023.01)

(58) Field of Classification Search
CPC .... G05D 1/042; G05D 1/0676; B64C 39/024; B64C 2201/18
(Continued)

(56) References Cited

U.S. PATENT DOCUMENTS

2010/0057278 A1   3/2010  Lee
2012/0277934 A1  11/2012  Ohtomo et al.
(Continued)

FOREIGN PATENT DOCUMENTS

CN   102756808 A   10/2012
CN   102967305 A    3/2013
(Continued)

OTHER PUBLICATIONS

The World Intellectual Property Organization (WIPO) International Search Report for PCT/CN2016/096833 dated May 19, 2017 8 Pages (including translation).

*Primary Examiner* — Yazan A Soofi
(74) *Attorney, Agent, or Firm* — Anova Law Group, PLLC

(57) ABSTRACT

A computer-implemented method for controlling an unmanned aerial vehicle (UAV) includes identifying a set of target markers based on a plurality of images captured by an imaging device carried by the UAV. The set of target markers includes at least two or more types of target markers that are in close proximity to be detected within a same field of view of the imaging device. The method further includes determining a spatial relationship between the UAV and the set of target markers based at least in part on the plurality of images, and controlling the UAV to approach the set of target markers based at least in part on the spatial relationship while controlling the imaging device to track the set of target markers such that the set of target markers remains within the same field of view of the imaging device.

20 Claims, 21 Drawing Sheets

Related U.S. Application Data continuation of application No. PCT/CN2016/096833, filed on Aug. 26, 2016.

(51) Int. Cl.
*B64C 39/02* (2023.01)
*B64U 70/00* (2023.01)

(58) Field of Classification Search
USPC .......................................................... 701/16
See application file for complete search history.

(56) References Cited

U.S. PATENT DOCUMENTS

| | | |
|---|---|---|
| 2014/0085469 A1 | 3/2014 | Sakano et al. |
| 2014/0257595 A1* | 9/2014 | Tillmann ............... G01C 11/02 701/2 |
| 2016/0104384 A1 | 4/2016 | Hanel et al. |
| 2016/0117853 A1* | 4/2016 | Zhong ................... G01C 21/00 345/634 |
| 2016/0122038 A1 | 5/2016 | Fleischman et al. |
| 2017/0017240 A1 | 1/2017 | Sharma et al. |
| 2017/0090271 A1 | 3/2017 | Harris et al. |
| 2017/0195549 A1* | 7/2017 | Cao ...................... G03B 15/006 |
| 2018/0025498 A1* | 1/2018 | Omari ....................... G06T 7/74 348/144 |
| 2020/0065605 A1 | 2/2020 | Manako et al. |

FOREIGN PATENT DOCUMENTS

| | | |
|---|---|---|
| CN | 103809598 A | 5/2014 |
| CN | 104049641 A | 9/2014 |
| CN | 104881041 A | 9/2015 |
| CN | 105550692 A | 5/2016 |
| WO | 2016070318 A1 | 5/2016 |

* cited by examiner

METHODS AND SYSTEM FOR AUTONOMOUS LANDING

CROSS-REFERENCE TO RELATED APPLICATIONS

This application is a continuation of application Ser. No. 16/285,388, filed on Feb. 26, 2019, now U.S. Pat. No. 11,194,344, which is a continuation of International Application No. PCT/CN2016/096833, filed on Aug. 26, 2016, the entire contents of both of which are incorporated herein by reference.

BACKGROUND OF THE DISCLOSURE

Modern unmanned aerial vehicles (UAVs) are used to perform a variety of tasks such as navigation, surveillance and tracking, remote sensing, search and rescue, scientific research, and the like. Autonomous and precise landing of the UAVs is often an important part of achieving such tasks. Existing technologies, however, fail to provide precise and reliable landing solutions.

SUMMARY OF THE DISCLOSURE

According to embodiments, a computer-implemented method is provided for controlling an unmanned aerial vehicle (UAV). The method comprises detecting a target marker based on a plurality of images captured by an imaging device carried by the UAV, determining a spatial relationship between the UAV and the target marker based at least in part on the plurality of images, and controlling the UAV to approach the target marker based at least in part on the spatial relationship while controlling the imaging device to track the target marker such that the target marker remains within a field of view of the imaging device.

According to embodiments, one or more non-transitory computer-readable storage media is provided. The storage media stores computer-executable instructions that, when executed by a computing system, configure the computing system to perform operations comprising detecting a target marker based on a plurality of images captured by an imaging device carried by an unmanned aerial vehicle (UAV), determining a spatial relationship between the UAV and the target marker based at least in part on the plurality of images, and controlling the UAV to approach the target marker based on the spatial relationship while controlling the imaging device to track the target marker such that the target marker remains within a field of view of the imaging device.

According to embodiments, a computer system is provided. The computer system comprises a memory that stores one or more computer-executable instructions and one or more processors configured to access the memory and execute the computer-executable instructions to perform steps comprising detecting a target marker based on a plurality of images captured by an imaging device carried by an unmanned aerial vehicle (UAV), determining a spatial relationship between the UAV and the target marker based at least in part on the plurality of images, and controlling the UAV to approach the target marker based on the spatial relationship while controlling the imaging device to track the target marker such that the target marker remains within a field of view of the imaging device.

According to embodiments, an unmanned aerial vehicle (UAV) is provided. The UAV comprises a memory that stores one or more computer-executable instructions and one or more processors configured to access the memory and execute the computer-executable instructions to perform steps comprising detecting a target marker based on a plurality of images captured by an imaging device carried by the UAV, determining a spatial relationship between the UAV and the target marker based at least in part on the plurality of images, and controlling the UAV to approach the target marker based on the spatial relationship while controlling the imaging device to track the target marker such that the target marker remains within a field of view of the imaging device.

In some embodiments, the target marker can be a landing marker, a heading marker, or a security marker. The target marker can comprise one or more concentric features.

In some embodiments, detecting the target marker can comprise identifying one or more features in the plurality of images, associating the one or more features with one or more candidate markers, assigning respective weights to the one or more candidate markers, each weight indicating a likelihood that the associated candidate marker is the target marker, and selecting the target marker from the one or more candidate markers based at least in part on the weights of the candidate markers.

In some embodiments, associating the one or more features with the one or more candidate markers can comprise comparing a first feature in a first image with a second feature in a second image based on one or more feature attributes and determining whether the first feature and the second feature correspond to a same candidate marker based on the comparison.

In some embodiments, the one or more feature attributes can comprise a size, a perspective, or a center distance. Assigning the respective weights to the one or more candidate markers can be based at least in part on the relative sizes of the one or more features. Assigning the respective weights to the one or more candidate markers can be based at least in part on whether the one or more features are concentric.

In some embodiments, controlling the imaging device to track the target marker can comprise detecting, based on the plurality of images, a deviation of the target marker from a predetermined position within a field of view of the imaging device and effecting a movement of the imaging device to correct the deviation. Effecting the movement of the imaging device can comprise controlling a carrier of the imaging device to move the imaging device relative to the UAV. Effecting the movement of the imaging device can comprise controlling the UAV to move with respect to a pitch axis, a yaw axis, or a roll axis of the UAV.

In some embodiments, determining the spatial relationship between the UAV and the target marker can comprise determining, based at least in part on the plurality of images, a first position of target marker in a camera coordinate system, and transforming the first position of the target marker in the camera coordinate system to a second position of the target marker in a UAV coordinate system based at least in part on a spatial relationship between the imaging device and the UAV.

In some embodiments, determining the spatial relationship between the UAV and the target marker comprises a horizontal distance and a vertical distance, and controlling the UAV to approach the target marker based on the spatial relationship can comprise generating one or more horizontal control commands for the UAV to reduce the horizontal distance between the UAV and the target marker based at least in part on the horizontal distance and generating one or more vertical control commands for the UAV to reduce the horizontal distance based at least in part on the horizontal distance.

In some embodiments, the spatial relationship between the UAV and the target marker can comprise a horizontal distance and a vertical distance, and controlling the UAV to approach the target marker based on the spatial relationship can comprise generating one or more horizontal control commands for the UAV to reduce the horizontal distance between the UAV and the target marker based at least in part on the horizontal distance and generating one or more vertical control commands for the UAV to reduce the horizontal distance based at least in part on the horizontal distance.

In some embodiments, the horizontal control commands can be used to control a horizontal velocity of the UAV. The vertical control commands can be used to control a vertical velocity of the UAV.

In some embodiments, the vertical velocity of the UAV can be negatively correlated to the horizontal distance between the UAV and the target marker. The horizontal control commands and the vertical control commands can be generated substantially concurrently.

In some embodiments, the UAV can be controlled to align its heading according to a heading marker prior to landing the UAV. In some embodiments, a security marker can be detected and verified prior to landing the UAV.

It shall be understood that different aspects of the disclosure can be appreciated individually, collectively, or in combination with each other. Various aspects of the disclosure described herein may be applied to any of the particular applications set forth below or data communication between any other types of movable and/or stationary objects.

Other objects and features of the present disclosure will become apparent by a review of the specification, claims, and appended figures.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE EMBODIMENTS

Figure 1:
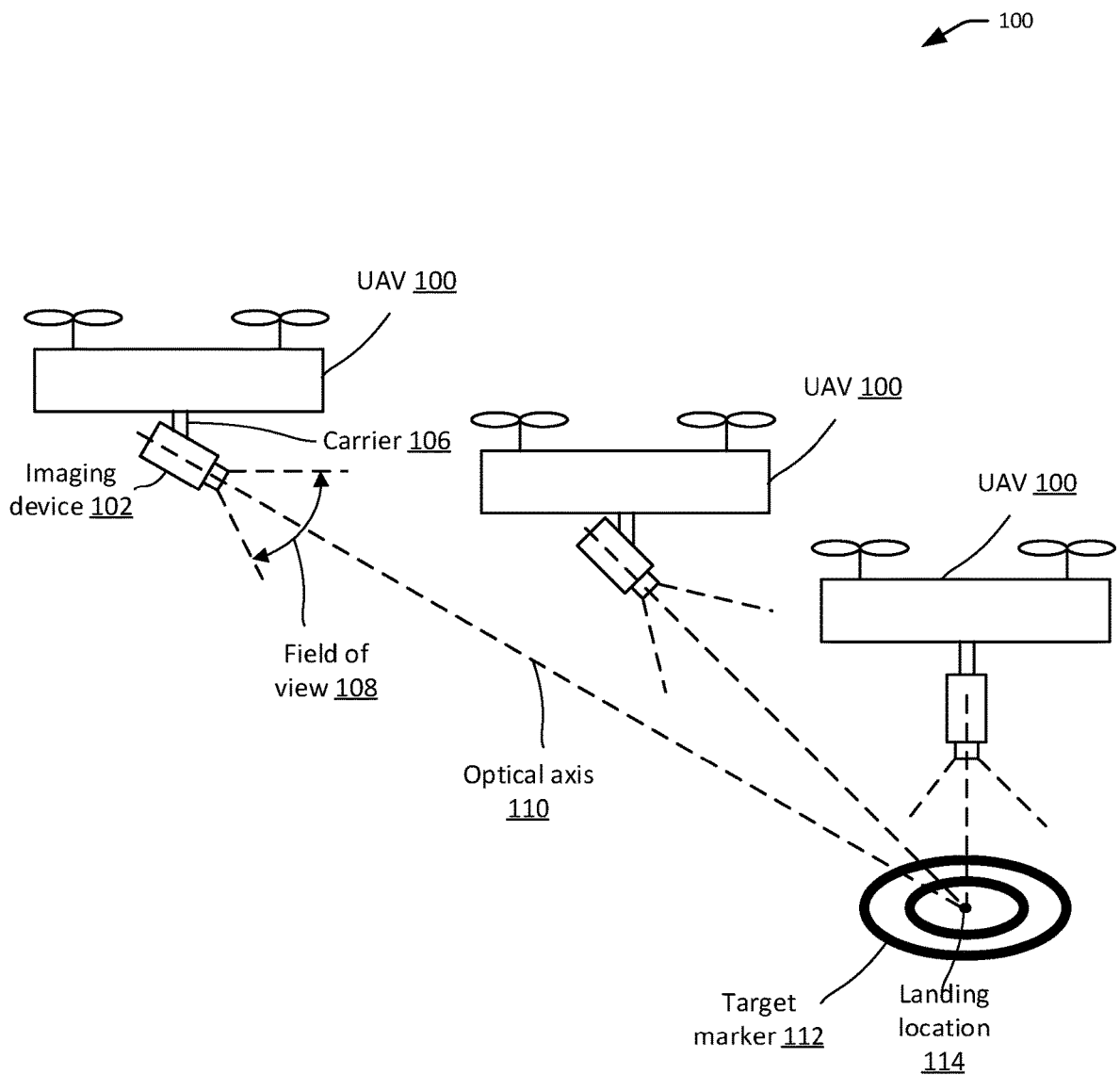
FIG. 1 illustrates an exemplary process for autonomous landing a UAV, in accordance with embodiments.

Existing technologies for autonomous UAV landing are insufficient in many situations. For instance, GPS-based technologies rely on the availability of GPS signals, which may be unavailable or weak in some cases (e.g., indoor or in a city). Additionally, the GPS signals may not offer the level of precision required for some landing scenarios. Vision-based technologies rely on recognition of certain visual markers by a camera attached to the UAV. However, the camera may be unable to detect the visual target due to its limited field of view as the UAV moves around, thereby affecting the reliability of landing operations.

The systems, devices, and methods are provided for autonomous, precise, and reliable landing the UAV that address some or all problems associated with existing UAV landing technologies including those discussed herein. In particular, one or more processors onboard and/or offboard a UAV may be configured to detect a target marker based on a plurality of images captured by an imaging devices (e.g., camera) carried by the UAV. The one or more processors may be configured to determine a spatial relationship between the UAV and the target marker based on the plurality of images. The UAV may be controlled (e.g., by the one or more processors) to approach the target marker based on the spatial relationship while the imaging device is controlled (e.g., by the one or more processors) to track the target marker.

Tracking of the target marker may be effected by moving the imaging device so as to maintain the target marker within a field of view of the imaging device, for example, at or near a predetermined position of the field of view (e.g., center). The imaging device may be moved by a carrier that can be controlled (e.g., by the one or more processors) to cause the imaging device to move relative to the UAV (e.g., with one or more degrees of freedom). Alternatively, the imaging device may be moved by movement of the UAV. Advantageously, tracking the target marker while landing prevents or reduces the likelihood of losing the target marker, and allows up-to-date control of the UAV based on the up-to-date position of the target marker, thereby improving landing accuracy.

One or more types of target markers may be detected. The target markers can include a landing marker that indicates a location for the UAV to land. Optionally, the target markers may include a heading marker that indicates a heading for the UAV when landed and/or a security marker that is used to authenticate the markers (e.g., the landing marker, the heading marker, and/or the security marker) and/or a provider of the markers. In some embodiments, the target markers may include patterns, colors, sizes, or other characteristics or features that facilitate robust detection in various situations such as from varying distances. For instance, the target markers can include concentric shapes (e.g., rings). The characteristics of the target markers may be used to convey the types of the markers, the base stations associated with the markers, landing location, UAV heading, authentication information, or any other suitable information.

The UAV may be controlled horizontally and vertically to approach a target marker (e.g., a landing marker) based on the images captured by the imaging device carried by the UAV. For instance, the horizontal velocity and/or the vertical velocity of the UAV may be controlled based on the spatial relationship between the UAV and the landing marker that is determined from the images. In some cases, the UAV may be controlled to descend vertically and move horizontally toward the landing marker at substantially the same time, while tracking the landing marker using the imaging device, thereby shortening the landing time and improving landing accuracy. In some embodiments, the vertical control of the UAV may be based on a horizontal relationship between the UAV and the landing mark. For instance, the vertical velocity may be negatively correlated to the horizontal distance between the UAV and the landing marker, such that the farther the UAV is to the marker, the slower the UAV descend, thereby improving landing safety and accuracy.

FIG. 1 illustrates an exemplary process for autonomous landing a UAV 100, in accordance with embodiments. Specifically, the UAV 100 can be controlled to detect and approach a target marker 112 that indicates a landing location, while tracking the target marker 112 using an imaging device 102 carried by the UAV 100.

The imaging device 102 can be configured to capture images of the surrounding environment. Examples of imaging device 102 can include monocular camera, stereo vision camera, radar, sonar, infrared camera, and the like. The images can be processed, by one or more processors onboard and/or offboard the UAV 100, to detect the target marker 112 and determine the landing location 114 for the UAV 100. The landing location 114 may be at or near the center of the target marker 112. The images can be used to determine, by the processors, a spatial relationship between the UAV 100 and the landing location 114. The spatial relationship can include, for example, a horizontal distance and/or a vertical distance between the UAV 100 and the landing location 114. Based on the spatial relationship, the UAV 100 may be controlled, by the processors, to move horizontally and/or vertically toward the landing location 114.

The imaging device 102 can be configured to track the target marker 112 while the UAV 100 approaches the target marker 112, based at least in part on the images taken by the imaging device. As illustrated, the imaging device 102 can be controlled to move so as to keep the target marker 112 or a portion thereof within a field of view (FOV) 108 of the imaging device 102. Further, the imaging device 102 may be controlled such that the target marker 112 or a portion thereof is maintained at a predetermined position within the field of view (and hence the images taken by the imaging device). For example, the imaging device 102 may be controlled so as to maintain the center of the target marker 112 at or close to the center of the field of view. In other words, the center of the target marker 112 maintained on or near the optical axis 110 of the imaging device 102. Any deviation from the predetermined position may be detected when the images are processed. The deviation can be corrected by changing the direction of the field of view 108 of the imaging device 102.

The imaging device 102 and the direction of its field of view 108 can be moved with the movement of the UAV 100. For instance, the imaging device 102 can move laterally and/or vertically when the UAV moves laterally and/or vertically. Additionally, the imaging device 102 and its field of view 108 can be moved by a carrier 106, which may be configured to allow the imaging device 102 to move relative to the UAV 100 with respect to a certain degrees of freedom (e.g., up to six degrees of freedom, three translational and three rotational). For instance, the carrier 106 may allow the imaging device 102 to rotate with respect to one, two, or three axes of freedom relative to the UAV. In various embodiments, the UAV 100, the carrier 106, and/or the imaging device 102 can be controlled by one or more processors onboard and/or offboard the UAV 100.

Markers can be provided to facilitate autonomous landing of UAVs. Different types of markers can be provided for different purposes. For example, a landing marker can be used to indicate a location to land the UAV. A heading marker can be used to indicate an orientation or heading for the UAV when landed. A security marker can be used to authenticate one or more objects such as the security marker, a landing marker, and/or a heading marker, or entities such as a provider of any of the markers. The markers can be located on the ground or on any other suitable surface (e.g., the top of a vehicle) that may be detected by the imaging device of the UAV.

Figure 2:
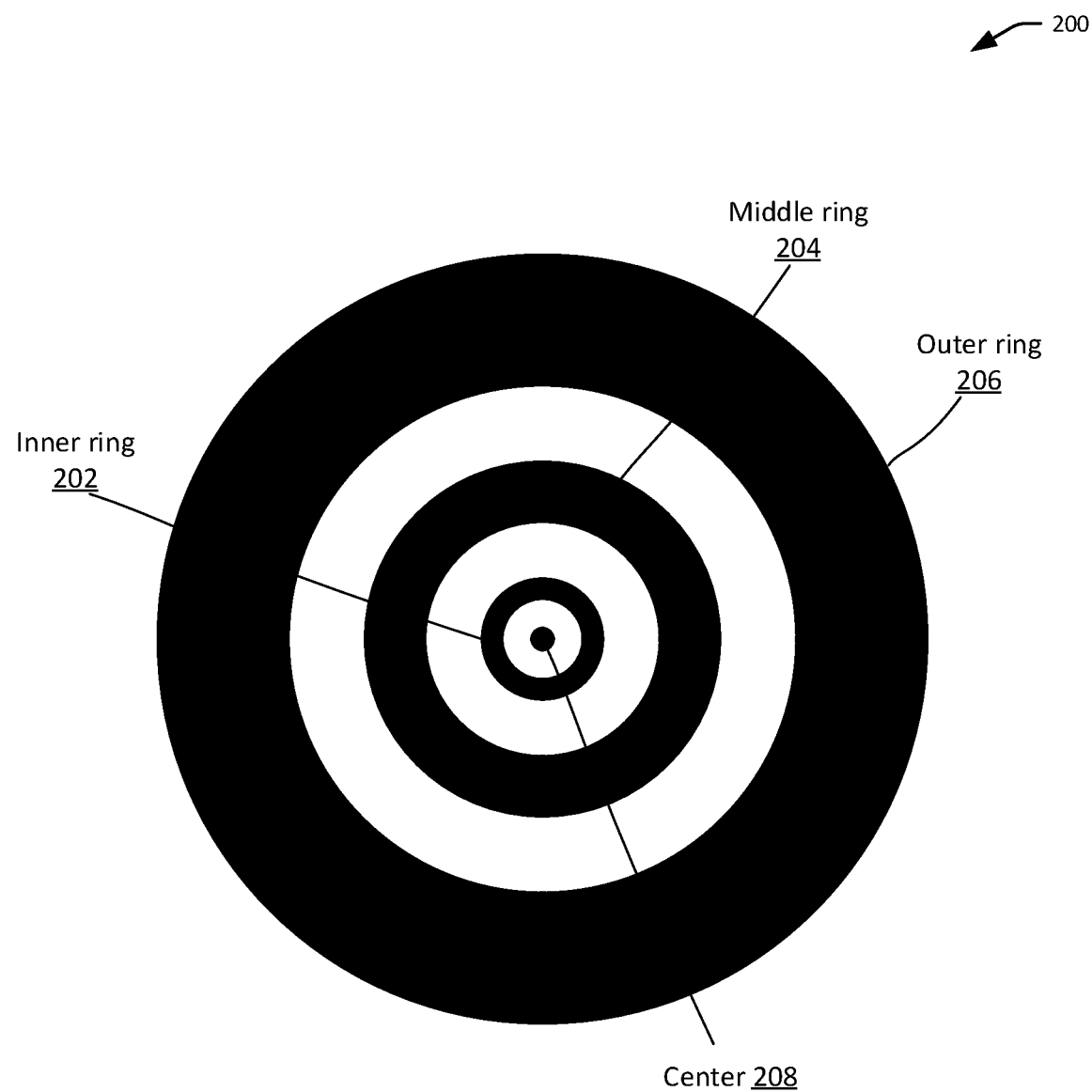
FIG. 2 illustrates an exemplary marker that comprises multiple concentric rings of different sizes, in accordance with embodiments.
Figure 3:
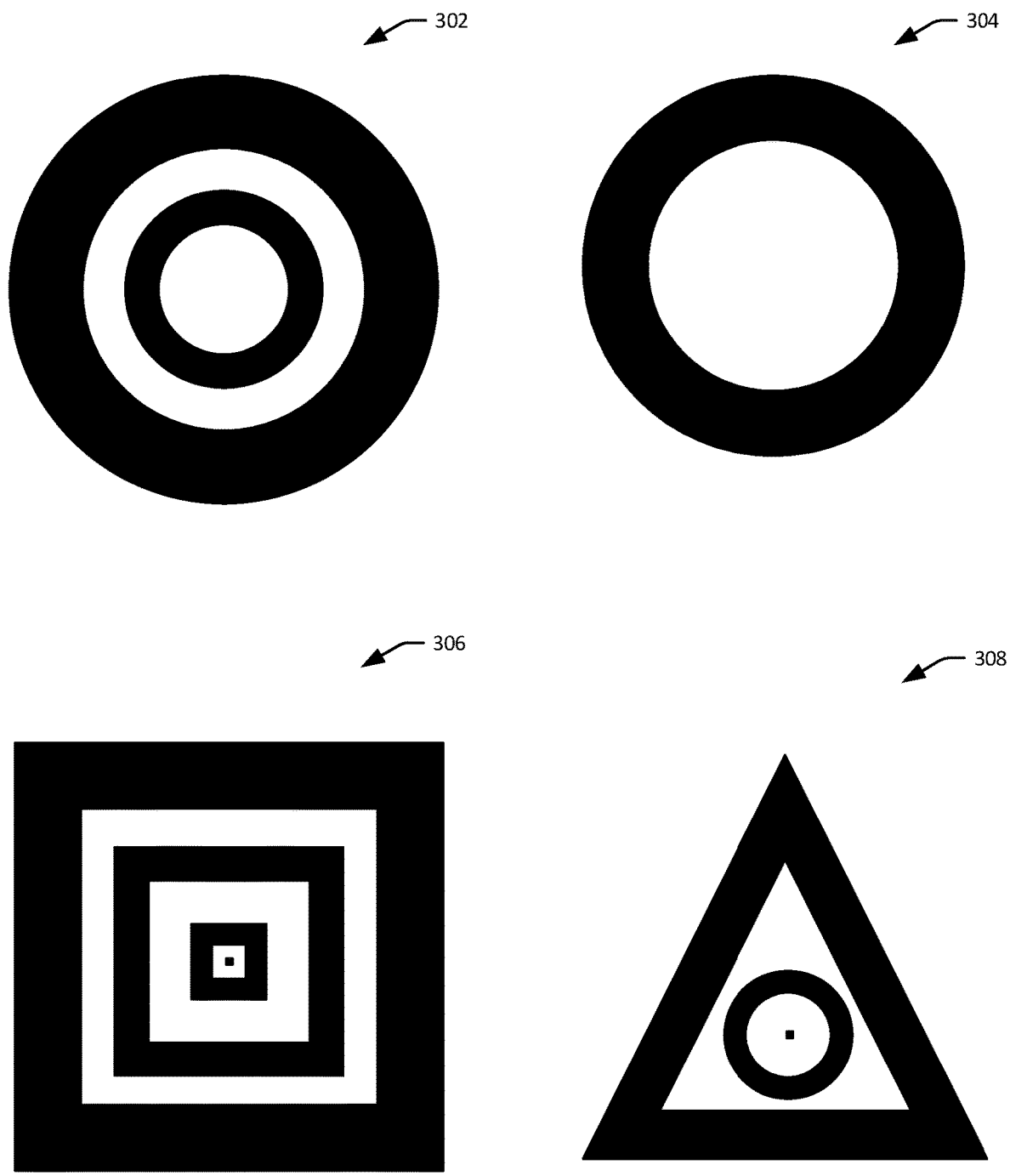
FIG. 3 illustrates other exemplary landing markers, in accordance with embodiments.

FIGS. 2-3 illustrates exemplary landing markers, in accordance with embodiments. FIG. 2 illustrates an exemplary marker 200 that comprises multiple concentric rings of different sizes, in accordance with embodiments. For example, the marker has an inner ring 202, a middle ring 204, and an outer ring 206, all concentric with respect to a center 208. In general, two geometric shapes are concentric when their geometric centers coincide at the same point or are sufficiently close to each other. In other embodiments, there may be zero or more than one middle rings between the inner ring 202 and the outer ring 206. The thickness of each of the rings 202, 204, and 206 may be the same or different. A radius of any given ring may refer to the inner radius of the ring, the outer radius of the ring, or an average of the inner and outer radii of the ring. A size of a ring may be indicated by one or more radii of the ring or a combination thereof. In some embodiments as illustrated, the center 208 is present in the marker. In some other embodiments, the center 208 may be absent in the marker.

Advantageously, the use of rings can provide robustness to changes in scale, orientation, and/or perspective. This can reduce the computation complexity and improve the accuracy and efficiency with which the markers can be detected. Concentric rings can provide the additional advantage that at least some of the set of rings can be detected at varying distances from the marker. For example, some or all of the rings may be detectable via an imaging device from a certain range (e.g., when the imaging device is equal or less than 5 m, 7 m, 10 m, 15 m, 20 m, etc., from the marker). In an example, the innermost ring in a concentric-ring marker can be detected even after the UAV has landed (e.g., when the distance between the imaging device and the marker is equal or less than 1cm, 3 cm, 5 cm, 10 cm, etc.).

While any suitable color or colors can be used for the landing markers or any other types of markers discussed herein, the use black and white or a single color can provide robustness to changes in illumination, thereby improving marker detection.

FIG. 3 illustrates other exemplary landing markers, in accordance with embodiments. The markers may include any number of rings, concentric or not concentric. For instance, as illustrated, marker 302 includes two concentric rings, while marker 304 includes a single ring. In some other embodiments, a marker may include four or more rings. Markers 302 and 304 also show the center of rings may be optional and may or may not be shown on the markers.

In some embodiments, the markers can include concentric shapes that are not rings, such as polygons or any other geometric shapes. For example, marker 306 includes concentric rectangles. The concentric shapes may not be the same type of shapes. For example, marker 308 includes a circle and a triangle that are concentric.

In some embodiments, markers having different location, shapes, colors, patterns, sizes, and/or other characteristics can be used to differentiate different base stations, types of markers, landing locations/headings, security information, and the like. Such markers can be detected and used according to their designated purposes.

Figure 4:
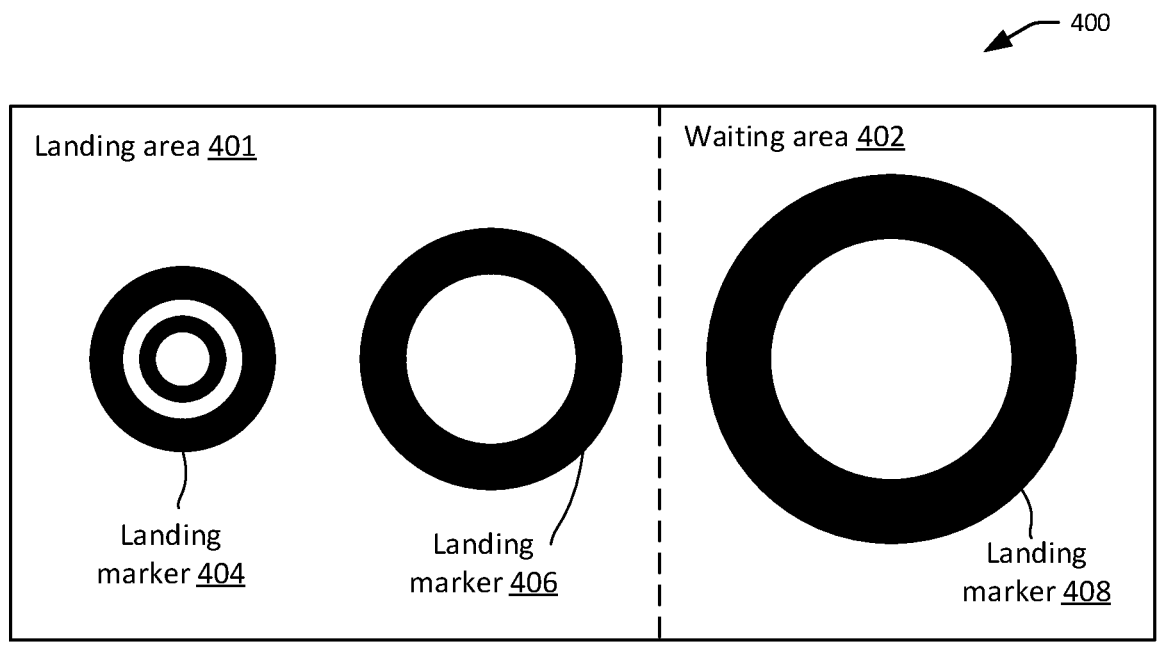
FIG. 4 illustrates an exemplary arrangement of landing markers, in accordance with embodiments.
Figure 4:
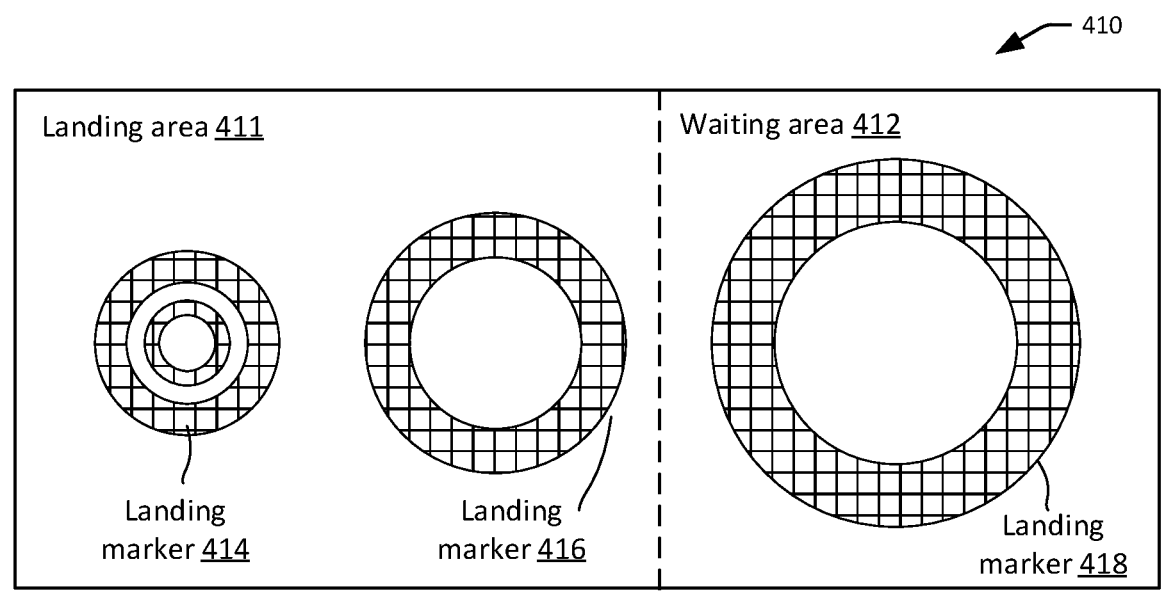

FIG. 4 illustrates an exemplary arrangement of landing markers, in accordance with embodiments. As illustrated, two base stations 400 and 410 each has three landing markers. The landing markers 404, 406, 408 associated with the base station 400 have a different color and/or pattern than for the landing markers 414, 416, 418 associated with the base station 410. For example, the markers for the base station 400 may be red whereas the markers for the base station 410 may be green. Accordingly, UAVs intended to land at a specific base station may be configured to detect, using an imaging device, landing markers having the designated color and/or pattern associated with the particular base station. For instance, UAVs designated to land at base station 400 may be configured to detect and approach red markers, while UAVs designated to land at base station 410 may be configured to detect and approach green markers. For instance, one or more processors onboard and/or off-board the UAVs may be configured to process the images taken by the imaging sensor by filtering out a particular color channel corresponding to the color associated with the base station.

Within the same base station, the landing markers may be located at different landing locations. Furthermore, different landing markers may indicate different landing priorities or landing durations. For instance, the base station 400 has a landing area 401 with two landing markers 404 and 406 and a waiting area 402 with one landing marker 408. The landing area 401 may be an area where the UAVs land for a relatively longer duration. The waiting area 402 may be an area where UAVs land temporarily or for a shorter duration, for example, when the landing area 401 is full. The landing markers 404, 406, and 408 may be visually distinctive to avoid confusion. For instance, landing marker 404 comprises concentric rings, the landing marker 406 comprises a single ring that is bigger than the outermost ring of the landing marker 404, and the landing marker 408 comprises a single ring that is yet bigger than the single ring of the landing marker 406. The base station 410 may have a similar or a different arrangement than for base station 400. Since the markers for the base station 410 are visually distinct than those for the base station 400, the landings at the base station 410 will not interfere with the landings at the base station 400.

Advantageously, autonomous and efficient landing of UAVs can be achieved at least in part by designing and arranging different landing markers at the desired locations, reducing the likelihood of interference between multiple landing UAVs. Thus, the time and resources used for managing the landing of UAVs can be reduced.

Figure 5:
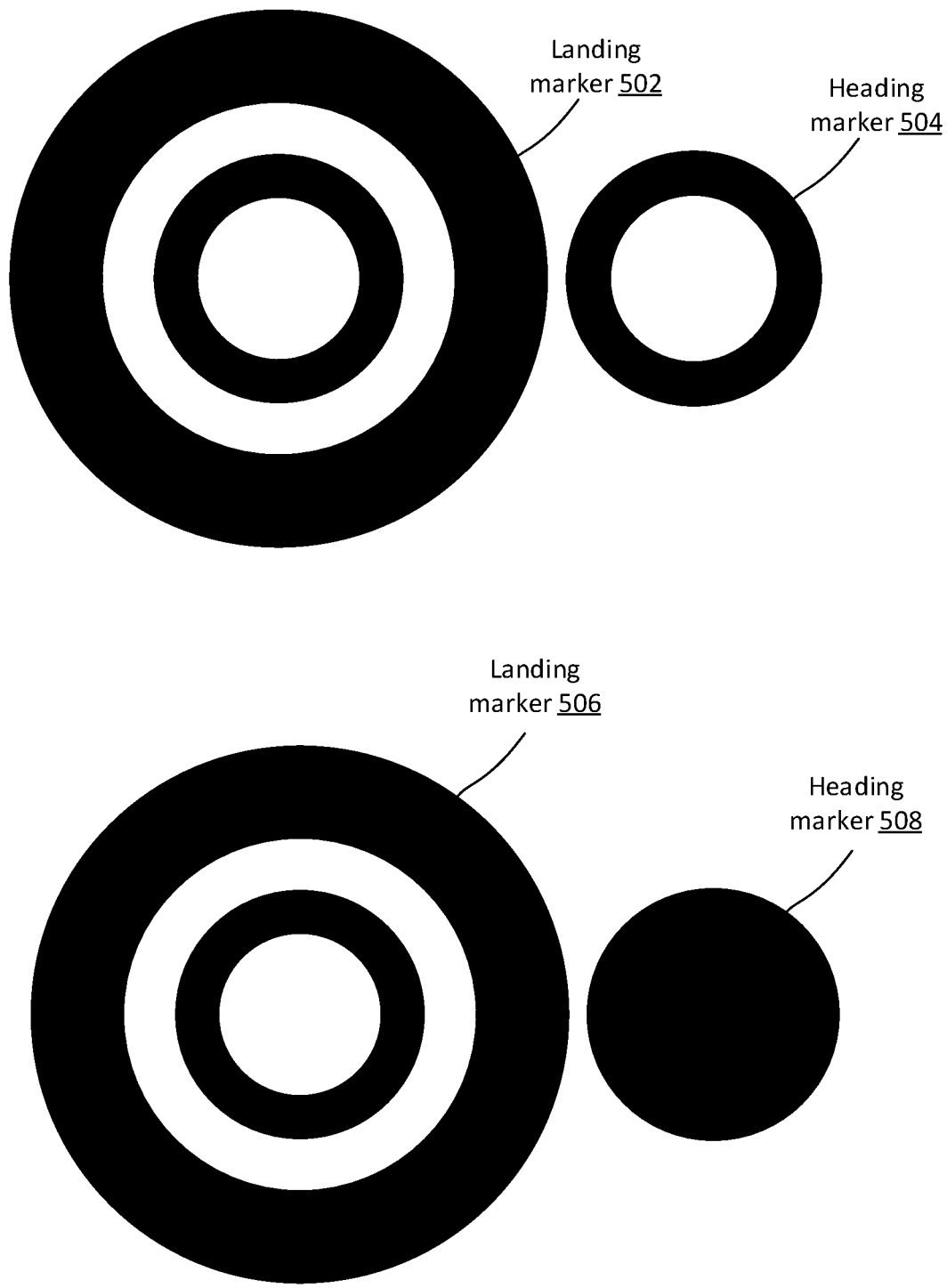
FIG. 5 illustrates exemplary heading markers, in accordance with embodiments.
Figure 6:
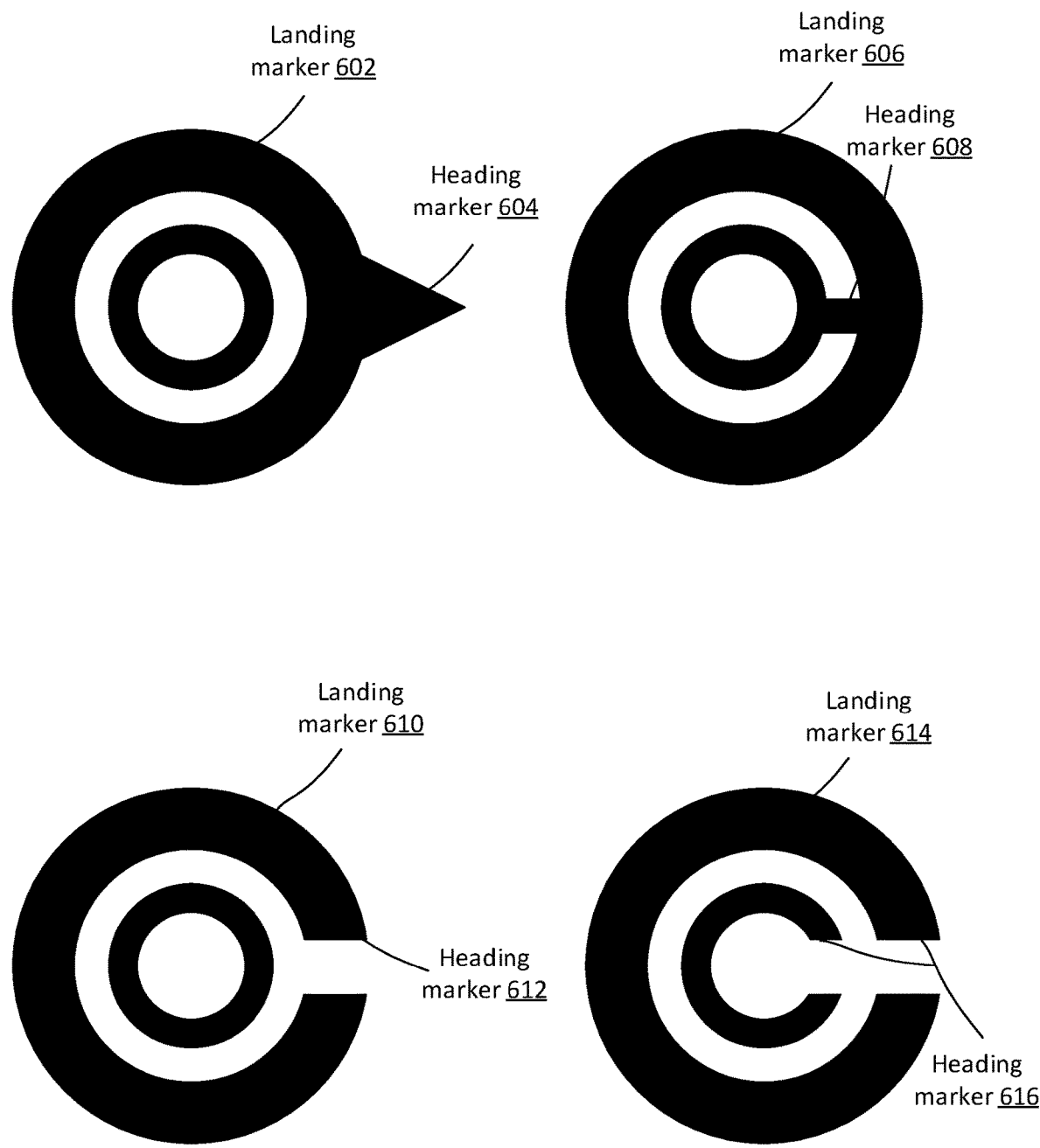
FIG. 6 illustrates additional exemplary landing and heading markers, in accordance with embodiments.
Figure 7:
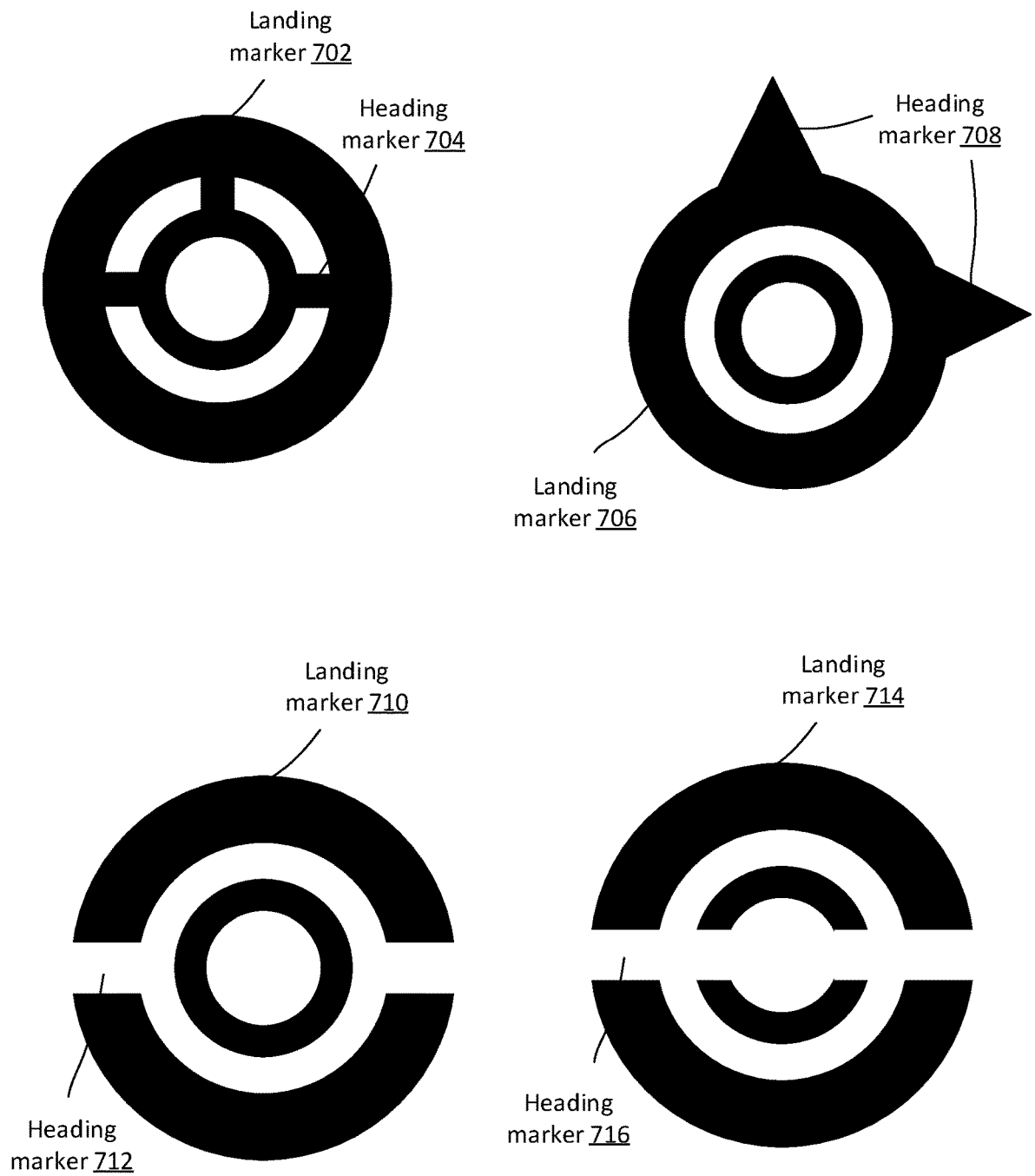
FIG. 7 illustrates additional exemplary landing and heading markers, in accordance with embodiments.

In some embodiments, heading markers may be provided to indicate a landing orientation (e.g., heading) of UAVs. For example, the heading marker can indicate a direction with which a longitudinal axis of the UAV should be aligned. A heading marker can be a part of a landing marker or located within close proximity to the landing marker so that the heading marker can be detected with the landing marker within the same field of view or in adjacent image frames. FIGS. 5-7 illustrates exemplary heading markers, in accordance with embodiments. FIG. 5 illustrates exemplary heading markers 504 and 508 that are separate from but near respective landing markers 502 and 506. The location of the heading markers relative to the center of the landing markers can indicate the direction of heading for landing a UAV. For example, the illustrated heading markers 504 and 508 indicate a heading toward the right of landing markers. In some embodiments, the heading markers are visually distinguished from the landing markers to facilitate correct identification of both. The visual distinction between the markers may be provided by a difference in shape, pattern, size, color, and the like. For instance, in FIG. 5, the landing markers 502 and 504 are shown as concentric rings, whereas the heading marker 504 is a single ring, and the heading marker 508 is a solid circle.

FIG. 6 illustrates additional exemplary landing and/or heading markers, in accordance with embodiments. A heading marker may include or be included in a landing mark. The heading marker can include component that is integral to a landing mark. In some cases, a landing marker may be the same as the heading maker. The heading marker may be an additive component of a landing marker. The heading of the UAV may be indicated by the geometric shape or orientation of the heading marker. For instance, the heading marker 604 comprises a protrusion that points to the heading direction (e.g., right) relative to the center of the landing marker 602. Similarly, the heading marker 608 indicates a similar heading direction as a horizontal bar to the right of the center of the landing marker 606.

Alternatively or additionally, the heading direction may be indicated by one or more openings, cavities, or missing or subtractive portions of a landing marker. In such case, the missing portion(s) may be considered the heading marker. Alternatively, a portion of the landing marker with the mission portion(s) or the landing marker as a whole may be considered the heading marker. For example, in FIG. 6, the landing marker 610 includes an opening in the outer ring that indicates the heading direction (e.g., right). The landing marker 610 includes both the inner ring and the outer ring with the opening. The heading marker 612 can refer to the landing marker 610 as a whole, the outer ring with the opening, or the opening itself. As another example, in FIG. 6, the landing marker 614 includes openings on both the inner ring and the outer ring. The openings collectively indicate a heading direction to the right of the center of the landing marker. The landing marker 614 includes both the inner ring and the outer ring. The heading marker 616 can refer to the landing marker 614 as a whole, the inner ring with its opening, the outer ring with its opening, or the openings themselves.

In some embodiments, the markers can indicate more than one possible landing heading for the UAV to land. FIG. 7 illustrates such exemplary landing and/or heading markers, in accordance with embodiments. The illustrated heading markers are similar to those discussed in FIG. 6 but each landing marker is associated with more than one landing heading. For example, the landing marker 702 is associated with three landing headings, left, up, and right, as indicated by the orientations of the corresponding bars 704. The landing marker 706 is associated with two landing headings, up and right, as indicated by the points of the respective heading markers 708. The landing marker 710 is associated with two landing headings, left and right, as indicated by the respective heading markers 712 (openings) in the outer ring. And the landing marker 714 is associated with two landing headings, left and right, as indicated by the respective heading markers 716 (openings) in the inner and outer rings. In some embodiments, the plurality of heading markers associated with a landing marker may appear similar to each other. In some other embodiments, the heading markers for a given landing marker may have different shapes, colors, patterns, sizes, and the like, to indicate different priorities or preferences among the heading markers. For instance, a first heading marker with a first visual appearance may indicate a more preferred landing heading; whereas a second heading marker with a second visual appearance may indicate a less preferred landing heading.

Optionally, security markers may be provided for security or authentication purposes. A security marker may be capable of conveying authentication information such as credentials, security identifiers, and the like. A security marker may be implemented by any suitable fiducial markers such as a one-dimensional or two-dimensional barcode or tag that is machine readable to extract corresponding authentication information. The authentication information conveyed by a security marker can be verified to authenticate one or more objects associated with the security marker. The objects associated with a security marker may include a landing area (e.g., of a base station) in which the security marker is located or an object (e.g., a top surface of a vehicle) to which the security marker is attached. Additionally or alternatively, the security marker may be used to authenticate one or more objects within a certain distance from the security marker, such as one or more landing markers and/or heading markers located near the security marker. The security marker may also be used to authenticate one or more entities associated with the security marker or any other objects such as a service provider, an organization, a government agency, and the like.

Figure 8:
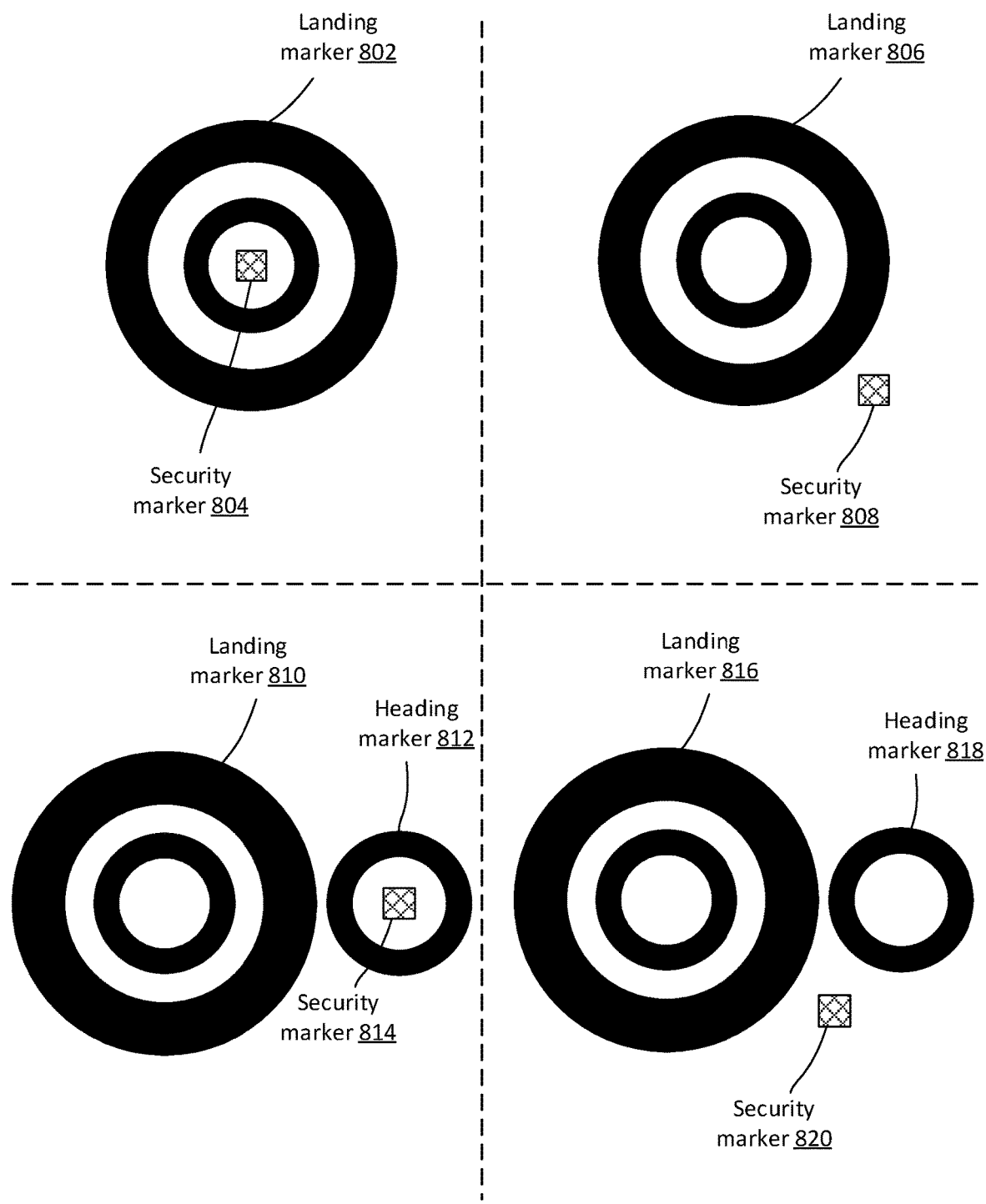
FIG. 8 illustrates exemplary placement of a security marker relative to landing/heading markers, in accordance with embodiments.

The security marker may be a part of or located near a landing marker and/or a heading marker, so that the security marker can be detected with the landing/heading markers within the same field of view or in adjacent image frames. FIG. 8 illustrates exemplary placement of a security marker relative to landing/heading markers, in accordance with embodiments. For example, as illustrated, a security marker 804 can be located on the landing marker 802 (e.g., at the center or between concentric rings). A security marker 808 can also be located next to a landing marker 806. Similarly, a security marker 814 can be located within a heading marker 812, or a security marker 820 can be located outside a heading marker 818. In some other embodiments, the security markers may be an integral part of a landing and/or heading marker. For example, the overall design of the landing and/or heading marker or a portion thereof may encode authentication information.

The security markers can enhance security of autonomous landing of UAVs. In some cases, an unauthorized entity may attempt to intercept a UAV using an unauthorized landing marker. Without security markers, the UAV may land or attempt to land at an unintended, unsafe, or unauthorized area using the fake landing marker. Consequently, the UAV may be intercepted by the unauthorized entity, damaged, or lost. By detecting and verifying a security marker associated the landing marker, a UAV may avoid such unauthorized interceptions by not landing at the unauthorized landing marker, when the security marker is not detected or when the verification fails.

Figure 9:
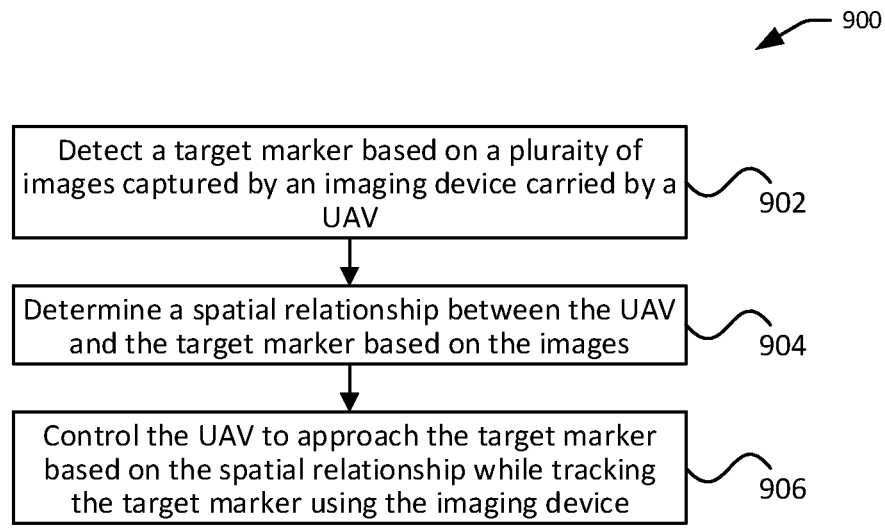
FIG. 9 illustrates an exemplary process for autonomous landing, in accordance with embodiments.

FIG. 9 illustrates an exemplary process 900 for autonomous landing, in accordance with embodiments. Aspects of the process 900 may be performed by one or more processors onboard and/or offboard a UAV. Some or all aspects of the process 900 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

At block 902, a target marker is detected based at least in part on a plurality of images captured by an imaging device carried by a UAV. The target marker can include a landing marker discussed herein. The images may be taken when the UAV and/or the imaging device is moving laterally or rotationally. In some embodiments, the imaging device may be controlled by a carrier to move with respect to up to three axes of freedom to search for the target marker. In some other embodiments, the imaging device be fixedly attached to the UAV and not movable relative to the UAV.

The target marker can be detected based at least in part on the captured images. The images can be processed to identify one or more features associated with the target marker (e.g., a ring or a portion thereof). The features identified across multiple images can be associated with one or more candidate markers. For instance, a first ring identified in a first image and a second ring identified in a second image may be determined to correspond the same candidate marker comprising the ring. Each of the candidate markers can be assigned a respective weight indicating the likelihood that the candidate marker is the target marker. A candidate marker can be selected as the target marker based on the weights of the candidate markers. For instance, the candidate marker with the highest weight may be selected.

In some embodiments, more than one target markers may be detected from the plurality of images. For instance, the target markers can include a landing marker, a heading marker, and/or a security marker, as discussed herein.

At block 904, a spatial relationship is determined between the UAV and the target marker based at least in part on the images. The spatial relationship between the UAV and the target marker may include a horizontal distance and/or a vertical distance between the UAV and the garget marker. In some embodiments, the position of the target marker in an image coordinate system can be converted to the position of the target marker in a camera coordinate system based on camera parameters. The camera parameters may include internal parameters (e.g., focal length) and external parameters (e.g., relative position). The position of the target marker in the camera coordinate system may be converted to the position of the target marker in a UAV coordinate system based at least in part on a spatial relationship, such as a rotational angle and/or translational displacement, between the camera and the UAV. The spatial relationship can also include an angle between the current heading of the UAV and a heading indicated by the target marker (e.g., heading marker).

At block 906, the UAV is controlled to approach the target marker based at least in part on the spatial relationship while the target marker is tracked using the imaging device. A state of the UAV may be controlled so as to cause the UAV to approach the target marker horizontally and/or vertically. The state of the UAV that can be adjusted may include velocity, altitude, acceleration, attitude, and the like. For example, a horizontal velocity and/or a vertical velocity of the UAV may be controlled so as to decrease the distance between the UAV and the target marker. As another example, the heading of the UAV may be adjusted to be substantially aligned a longitudinal axis of the UAV along a direction indicated by a heading marker before or during the approach of the UAV to the landing marker. In some embodiments, the UAV may determine whether to approach a landing marker based on the result of validation of a security marker.

Figure 10:
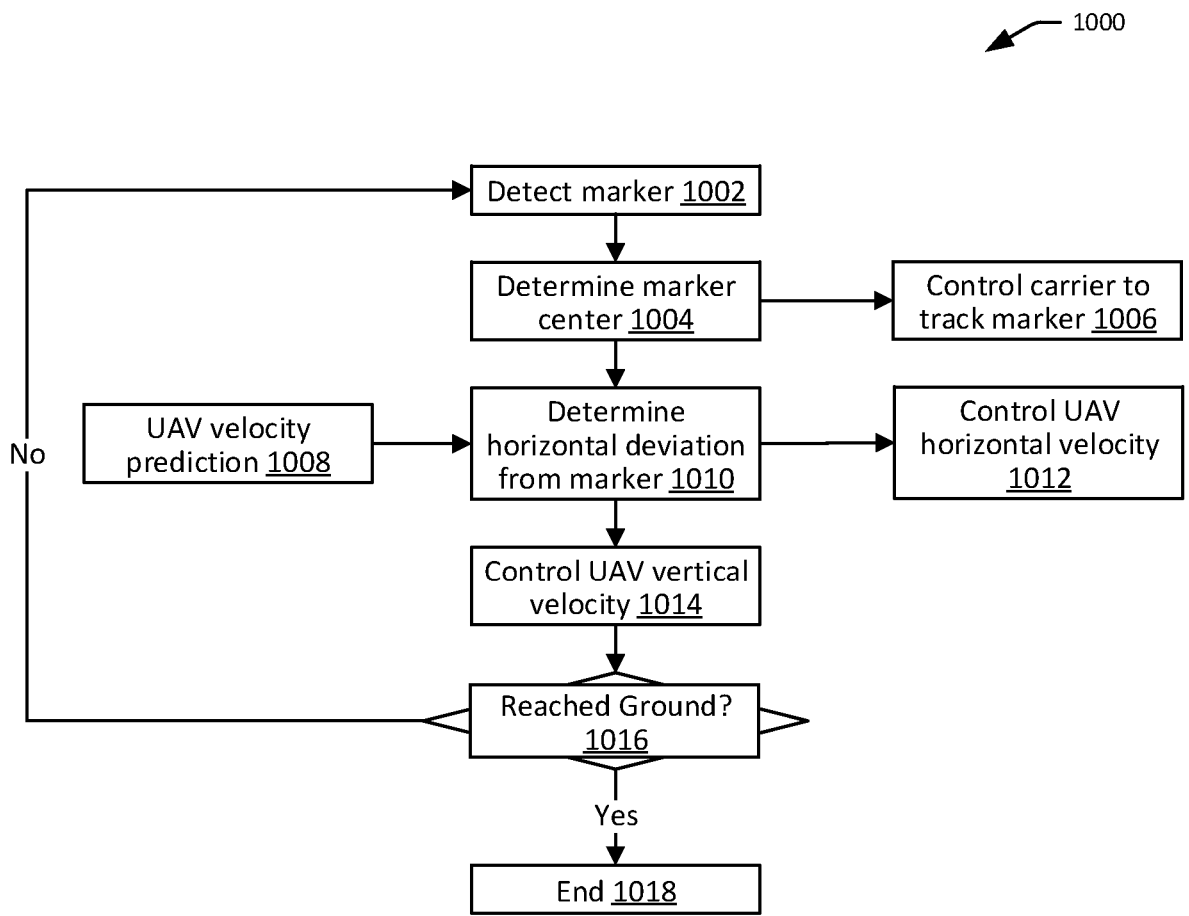
FIG. 10 illustrates another exemplary process for autonomous landing, in accordance with embodiments.

FIG. 10 illustrates another exemplary process 1000 for autonomous landing, in accordance with embodiments. Aspects of the process 1000 may be performed by one or more processors onboard and/or offboard a UAV.

At block 1002, a marker is detected. The marker can be a landing marker that indicates a landing location for the UAV. The marker can be detected from one or more images taken by one or more imaging devices carried by the UAV. The marker may be identified using any suitable object and/or pattern recognition techniques such as the detection techniques described herein. The detection of the marker can be performed periodically, for example, at a given frequency (e.g., 1 Hz, 5 Hz, 10 Hz, 15 Hz, 16 Hz, 20 Hz, 50 Hz, 100 Hz).

At block 1004, a center of the marker is determined. In some cases, the center of the marker may be explicitly marked and detected. In other cases, the center of the marker is not marked and need to be estimated. The determined center of the marker may be an estimated geometrical center of the marker. For instance, if the marker comprises a ring, the center of the marker is at or close to the center of the ring. If the marker comprises multiple concentric rings, the center of the marker can be calculated based on the estimated centers of the respective rings (e.g., by using least squares).

Determining a marker center can include determining a position of the marker center within any suitable coordinate system. For instance, a position of the marker center within an image coordinate system can be determined. Additionally, a position of the marker center can be determined in a coordinate system of the imaging device and/or the coordinate system of the UAV.

At block 1006, a carrier can be controlled to track the marker. Tracking the marker may include maintaining the marker center at or near a predetermined position (e.g., center) of the field of view of the imaging device. In some embodiments, a pitch, yaw, and/or yaw of the carrier may be controlled so as to change a pose of the imaging device supported by the carrier. The pose change of the imaging device can be used to correct a deviation of the center of the marker from the predetermined position in the field of view of the imaging device. The control for the carrier may be implemented using a control loop feedback mechanism such as a proportional-integral-derivative controller (PID controller). In some other embodiments, a pitch, yaw, and/or yaw of the UAV may be controlled to track the marker.

At block 1008, the velocity of the UAV is predicted. The velocity of the UAV may include one or more horizontal and/or vertical velocity components. The velocity of the UAV may be predicted based on sensor data obtained from various sensors of the UAV such as inertial measurement unit (IMU), image sensors, location sensors (e.g., GPS), and the like. The prediction of the UAV velocity may be performed periodically, for example, at a given frequency (e.g., 1 Hz, 5 Hz, 10 Hz, 15 Hz, 16 Hz, 20 Hz, 50 Hz, 100 Hz, 200 Hz, 500 Hz, 1000 Hz).

At block 1010, horizontal deviation of the UAV from the marker center is determined. The horizontal deviation may be expressed as relative displacement between the UAV and the marker center along two axes of the horizontal plane (e.g., x axis and y axis). The horizontal deviation may be determined based on the predicted UAV velocity, as determined in block 1008, and/or marker center position, as determined in block 1004.

At block 1012, the horizontal velocity of the UAV is controlled. The control of the UAV's horizontal velocity can be based on the horizontal deviation of UAV from the marker center, as determined in block 1010. The UAV's horizontal velocity can be controlled so as to minimize the horizontal deviation of the UAV from the marker center. The control for the UAV horizontal velocity may be implemented using a control loop feedback mechanism such as a PID controller.

At block 1014, the vertical velocity of the UAV is controlled. The control of the UAV vertical velocity can be based on a vertical deviation of UAV from the marker center. The vertical deviation can be determined based on one or more sensors such ultrasound sensors, lidar, image sensors (e.g., mono-vision sensors, stereo-vision sensors), and the like. In some cases, the vertical deviation can be determined based on the size of the marker detected in block 1002. In some embodiments, the control of the vertical velocity of the UAV may be based on the horizontal deviation from marker center, as determined in block 1010. For instance, the vertical speed may be negatively correlated with the horizontal deviation. Advantageously, such an approach can ensure a more gradual descend when the horizontal deviation between the UAV and the marker center is large (e.g., when the UAV is far from the marker center) and a faster descend when the horizontal deviation is smaller (e.g., when the UAV is directly above or close to directly above the marker).

At block 1016, it is determined whether the UAV has reached ground. The determination can be based on sensor data from any suitable sensors such as a touch sensor, a proximity sensor, a thermometer, a GPS sensor, and the like.

If it is determined, at block 1016, that the ground has not been reached, then the process 1000 loops back to block 1002 to detect the marker. For instance, UAV and/or the imaging device may be controlled to move in a predetermined pattern so as to search for the marker. Otherwise, if it is determined that the ground has not been reached, then the process 1000 ends at block 1018.

Figure 11:
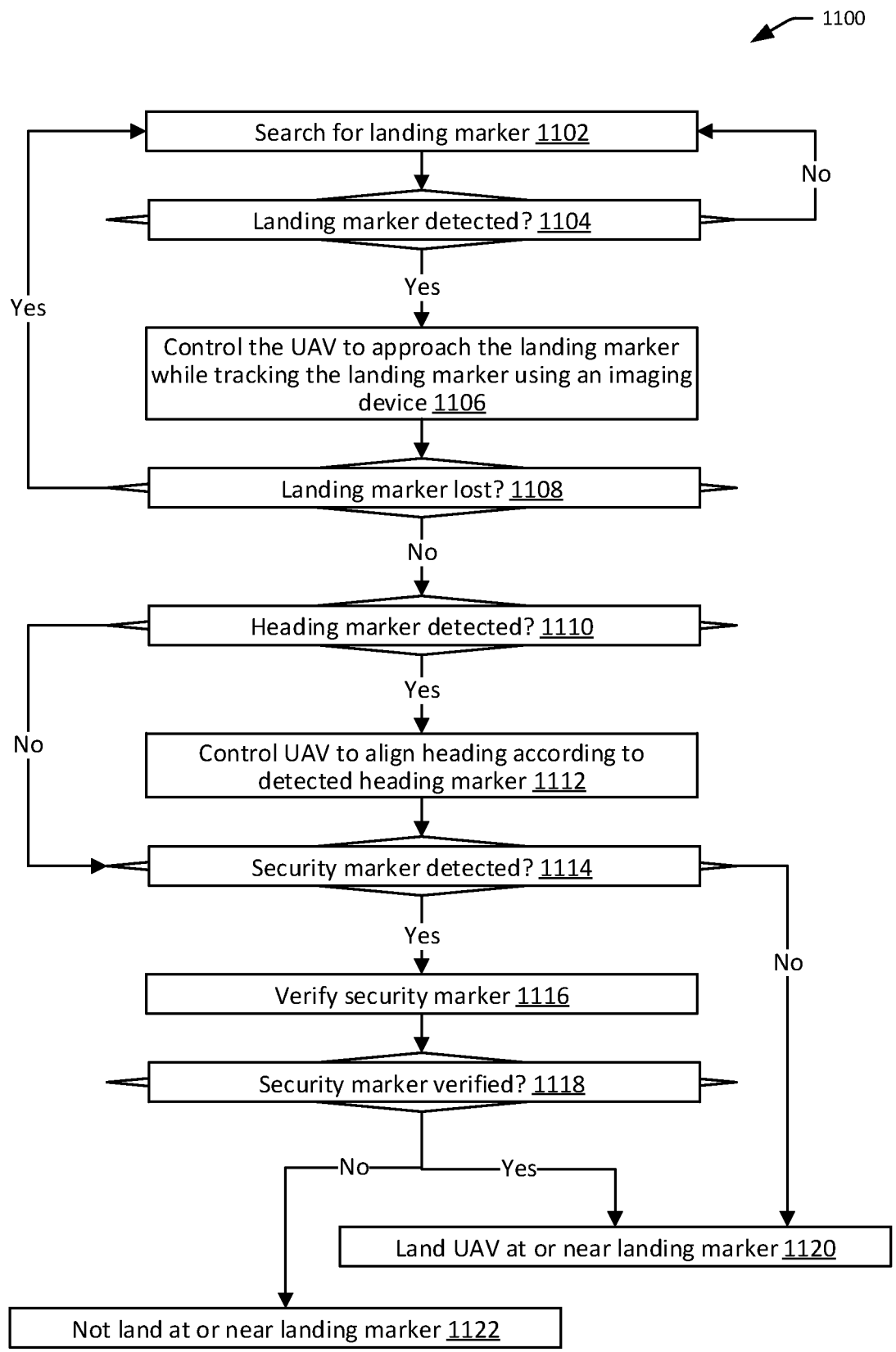
FIG. 11 illustrates another exemplary process for autonomous landing, in accordance with embodiments.

FIG. 11 illustrates another exemplary process 1100 for autonomous landing, in accordance with embodiments. Aspects of the process 1100 may be performed by one or more processors onboard and/or offboard a UAV.

At block 1102, a landing marker is searched. To search for the landing mark, the UAV may be controlled to hover at or move to one or more predetermined positions. Or, the UAV may be controlled to move in a predetermined pattern (e.g., in a circle). Additionally or alternatively, the imaging device may be controlled to maintain a predetermined pose (e.g., point straight down or ahead in the same direction as the heading of the UAV) and/or move relative to the UAV (e.g., rotation around a pitch axis, a yaw axis, and/or a roll axis). The movement of the imaging device relative to the UAV may be caused by a carrier.

In some embodiments, the search for the landing marker may be initiated in response to instructions (including signals and control data) received from a remote device (e.g., a remote controller, a base station, another UAV). The instructions may indicate that the UAV is to start searching for and descending toward a landing marker. The instructions may be generated based on a user action (e.g., remote controller operation) or by an automated or semi-automated process running on the remote device (e.g., a UAV landing management program). In some other embodiments, the search for landing may be initiated autonomously by the UAV based on internal or external triggers such as UAV state (e.g., UAV position, attitude, altitude, battery life), time, geographic location, sensor data, and the like. For instance, the UAV may be configured to start searching for a landing marker when its battery life is below a predetermined threshold (e.g., less than 10% of a full charge). As another example, the UAV may be configured to start searching for a landing marker after it has been flying for a predetermined period of time (e.g., 20 minutes).

Instructions about the markers to search for may be transmitted to or otherwise made available to the UAV. Such instructions may include the types of markers (e.g., landing marker, heading marker, security marker) to search for and the characteristics associated with each type of the marker. Examples of such characteristics of the markers can include color, shape, pattern, texture, and the like. For instance, the instructions may indicate that a landing marker has concentric rings, a heading marker has a single ring, and a security marker is a two-dimensional barcode. The instructions may indicate whether, where and/or how to search for and/or detect the markers. In some embodiments, the instructions may vary depending on the base station associated with the markers. For example, different color information may be associated with markers for different base stations. In some embodiments, the instructions may vary depending on the landing strategy for a specific UAV. For example, the instructions may instruct a UAV to land toward the smallest ring detected in a concentric-ring marker located at a first area of a base station. Alternatively, the instructions may instruct the UAV to land toward the largest ring detected in a single-ring marker located at a second area of the base station (e.g., waiting area). Such instructions may be generated based on current traffic condition (e.g., a number of UAVs waiting to land and a number of spots available for landing), a priority of the UAVs, a current status of the UAV (e.g., battery life), and the like.

In some embodiments, the actual size of a marker may be made available to one or more processors onboard the UAV so that the processors may determine a distance to the marker based on a relationship between a perceived size of the marker in an image and the actual size of the marker. In some other embodiments, the actual size of the marker is not made available to the processors.

In various embodiments, the instructions discussed above may be transmitted to the UAV when the UAV is operating (e.g., airborne). For instance, the instructions may be transmitted dynamically to the UAV from a remote controller or base station. In some other embodiments, such instructions may be generated automatically by the UAV based on the current state of the UAV or the current environment. In yet some other embodiments, the instructions may be preloaded into a memory unit of the UAV and is available to one or more processors onboard the UAV. Advantageously, the landing instructions can be used provide dynamic, fine-grained, and flexible control over the landing of the UAVs.

At block 1104, it is determined whether a landing marker is detected. The landing marker may be detected from one or more images taken by an imaging device carried by the UAV. In some embodiments, the UAV may be configured to carry more than one imaging device or vision sensor. The images from some or all of these imaging devices or vision sensors may be processed by one or more processors onboard and/or offboard the UAV to identify a landing marker. Detailed discussion of marker detection techniques is provided in FIGS. 12-15.

If it is determined in block 1104 that a landing marker has been not been detected, then the process 1100 loops back to block 1102 to search for a landing marker, as discussed above. Otherwise, if it is determined in block 1104 that a landing marker has been detected, then at block 1106, then UAV is controlled to approach the landing marker while the landing marker is tracked using an imaging device. Detailed discussion of controlling the UAV to approach the landing marker while tracking the landing marker is provided in FIGS. 16-19.

At block 1108, it is determined whether the imaging device has lost track of landing marker, that is, when landing marker is no longer within the field of view of the imaging device. This can happen due to movement of the UAV and/or the imaging device or a temporary blockage of the landing marker by an obstacle. If it is determined in block 1108 that the landing marker is lost, then the process 1100 loops back to block 1102 to search for a landing marker, as discussed above. In some embodiments, when the imaging device loses track of a target marker, the UAV may be controlled to ascend to a predetermined altitude. The UAV and/or the imaging device may be controlled to rotate a predetermined pattern (e.g., around a yaw axis and/or a pitch axis) to scan for the target marker until the target marker is found or until a predetermined time has expired. If the landing marker is not lost, then the process 1100 proceeds to block 1110.

At block 1110, it is determined whether a heading marker is detected. In some embodiments, the UAV, the carrier and/or the imaging device may be controlled to search for the heading marker in a similar manner as for the landing marker discussed in block 1102. The heading marker may be detected in same or different images as the landing markers. In some cases, the heading marker may be detected before the UAV starts approaching the landing marker or while the UAV is approaching the landing marker.

The search for the heading marker may be required or not required depending the instructions or configuration parameters accessible to the UAV. The search for the heading marker, where required, may be limited to a predetermined period of time (e.g., one minute). If the heading marker is not found within the time period, then the UAV may be allowed to land with any heading direction. Or, the UAV may be configured to land at a predetermined default heading direction absent a landing marker.

If it is determined in block 1110 that a heading marker has been detected, then at block 1112, the UAV may be controlled to align its heading according to the detected heading marker. For example, if the detected heading marker points to north, then the UAV may be controlled to rotate around its vertical axis so as to align its heading to point to north or a substantially northern direction. In some embodiments, one or more images containing the heading marker can be processed to determine an orientation or direction indicated by the heading marker. For example, features can be detected during the image processing. The attributes of the features such as edge direction or orientation can be used to determine a heading direction.

The heading of the UAV is aligned prior to the landing of the UAV. In some embodiments, the heading of the UAV is aligned immediately prior to the landing of the UAV. For example, the UAV may be controlled to move to a position directly above the landing marker, align its heading direction according to the heading marker, and then descend to land at the landing marker. Alternatively, the heading of the UAV may be adjusted at any suitable time prior to landing. For example, the heading may be adjusted before the UAV starts to descend toward the landing marker or while the UAV descend the landing marker.

If it is determined in block 1110 that a heading marker is not detected or not required, then the process 1100 proceeds to block 1114, where it is determined whether a security marker is detected. As discussed above, the security marker can be used to authenticate one or more markers or a provider of the markers. For instance, the security marker may be located close to the landing marker and/or the heading marker so that validation of the security marker would also validate the other markers.

The security marker may be detected in the same or different images as the landing and/or heading markers. The security marker may be detected using any suitable marker reader that may be implemented in hardware (e.g., barcode scanner) and/or software. Such a marker reader may be separate from the imaging device used to detect the landing marker. Alternatively, the marker reader may an integral part of the imaging device. In some embodiments, the security marker may be detected in a similar fashion as the landing and/or heading markers.

Security information may be extracted from the security marker (e.g., by the marker reader) and verified. The security information may be verified against information preloaded on the UAV. Alternatively, the security information may be provided to a remote device and verified remotely. The verification result may then be transmitted back to the UAV. In some embodiments, the security information from the security marker may be combined with other information such as time information (e.g., GPS time) and/or location information to derive combined security information for enhanced security. The combined security information may then be verified. In some cases, the security marker may be detected before the UAV starts approaching the landing marker or while the UAV is approaching the landing marker. The security marker may be detected before or after the detection of the heading marker.

At block 1118, it is determined whether the security marker has been successfully verified. If it is successfully verified, then at block 1120, the UAV is controlled to land at or near the landing marker previously described. If it is not successfully verified or if the security marker is not detected or required, then the UAV is controlled to not land at or near the landing marker. For instance, the UAV may be controlled to maintain its current position or even fly away from the landing marker. In some embodiments, the UAV may be configured to provide warning signals. The warning signals may be provided by the UAV itself (e.g., via sound and/or light) or transmitted to a remote device (e.g., a remote controller or base station). The warning signals may include information about an unauthorized security marker and/or unauthorized landing marker, such as positions or images thereof.

Figure 12:
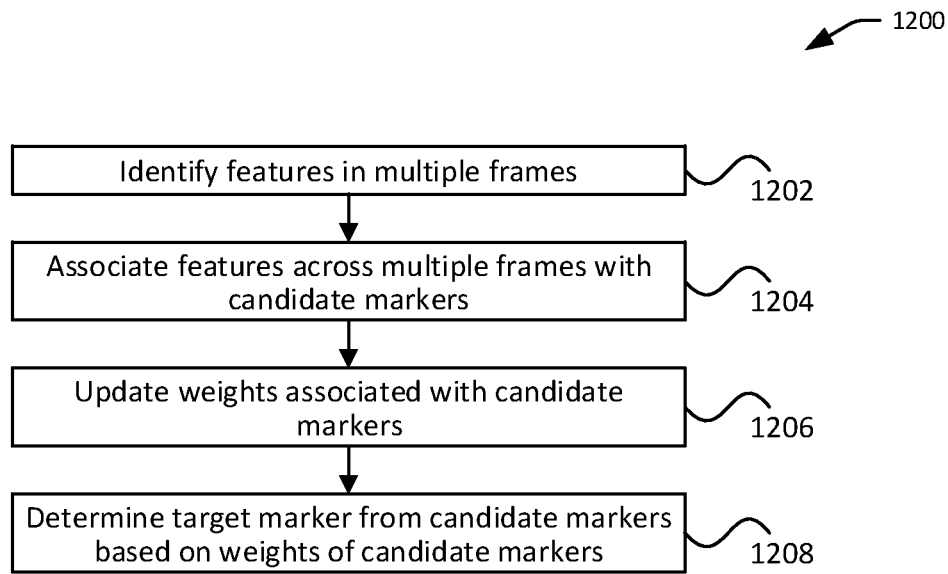
FIG. 12 illustrates an exemplary process for detecting a target marker, in accordance with embodiments.

FIG. 12 illustrates an exemplary process 1200 for detecting a target marker, in accordance with embodiments. The target marker may be detected based on a plurality of images captured by an imaging device carried by a UAV. The target marker can be a landing marker that indicates a landing location for the UAV. Alternatively, the target marker can be a heading marker that indicates a landing heading, or a security marker that provides security for the landing. Aspects of the process 1200 may be performed by one or more processors onboard and/or offboard a UAV. The processors may include one or more central processing units (CPUs), graphics processing units (GPUs), field programmable gate arrays (FPGAs), or the like. In some embodiments, at least one of the processors is operatively coupled to the imaging device. In some embodiments, at least one of the processors is a part of the imaging device.

At block 1202, features associated with the target marker (e.g., a landing marker) are identified in multiple frames of images. The images can be captured by an imaging device carried by a UAV. The images are processed to detect and isolate features associated with one or more candidate markers, which are potential candidates for the target marker. The features may include geometric shapes contained in the markers (e.g., rings) or portions of the geometric shapes (e.g., corners, edges, arcs). The features may be detected and/or extracted using any suitable feature detection/extraction techniques such as Hough transform, thresholding, scale-invariant feature transform (SIFT), and the like. For example, if it is known that the target marker is of a particular color (e.g., red), then features from the particular color channel may be subtracted using one or more thresholds.

In various embodiments, any suitable feature detection techniques may be used to detect the marker features. Instructions describing the features to be detected may be known beforehand. For instance, instructions provided to the UAV and/or preloaded in a memory unit of the UAV may include description of the features. The actual size of the marker may or may not be available to the UAV.

At block 1204, features identified in the multiple frames are associated with candidate markers. In some embodiments, the features may be associated directly with candidate markers. For instance, a candidate marker can comprise a ring. The ring or portions thereof may be detected and identified as features in different frames. These features can be associated with the same identifier to indicate that the features correspond to the same candidate marker. In some other embodiments, the features may be first associated with respective candidate marker components and the candidate marker components may then be associated with candidate markers. As an example, a candidate marker may comprise multiple concentric rings, each ring being a candidate marker component. For each ring, a set of features can be identified as corresponding to the ring and therefore assigned a unique identifier. Next, the rings can be identified as concentric and therefore associated with the same candidate marker. Therefore, the sets of features associated with the various candidate component markers may be assigned the same identifier to indicate that they are all associated with the same candidate marker. Any suitable target detection and/or tracking techniques may be used, including tracking-by-detection methods using, for example, Kalman filters or particle filters.

At block 1206, weights associated with candidate markers are updated. The weight value associated with a candidate marker indicates the likelihood that the given candidate marker is the target marker. Initial weight values may be assigned to the candidate markers when the candidate markers are detected. The weight values may be periodically or continuously updated as new images are acquired based on attributes of the candidate markers such as the relative sizes and whether the candidate marker includes concentric components, and the like. In some embodiments, the weights are associated with features and updated based on feature attributes such as relative sizes and concentricity.

At block 1208, a target marker is determined from candidate markers based on the weights of the candidate markers. In some embodiments, the candidate markers may be ranked according to their weight values and the candidate marker with the highest weight value may be selected as the target marker. If the target marker is a landing marker, the center of the target marker is used as the landing location for the UAV. If the target marker is a heading marker, the orientation of the target marker may be determined and used as direction for the UAV heading when landed. If the target marker is a security marker, the target marker may be read to extract security information, which may be verified. In some embodiments, the process 1200 may be repeated as new images become available. In embodiments where the weights are associated with features, a feature (e.g., ring) with the highest weight may be selected and the center of the feature may be determined to be the landing location.

Figure 13:
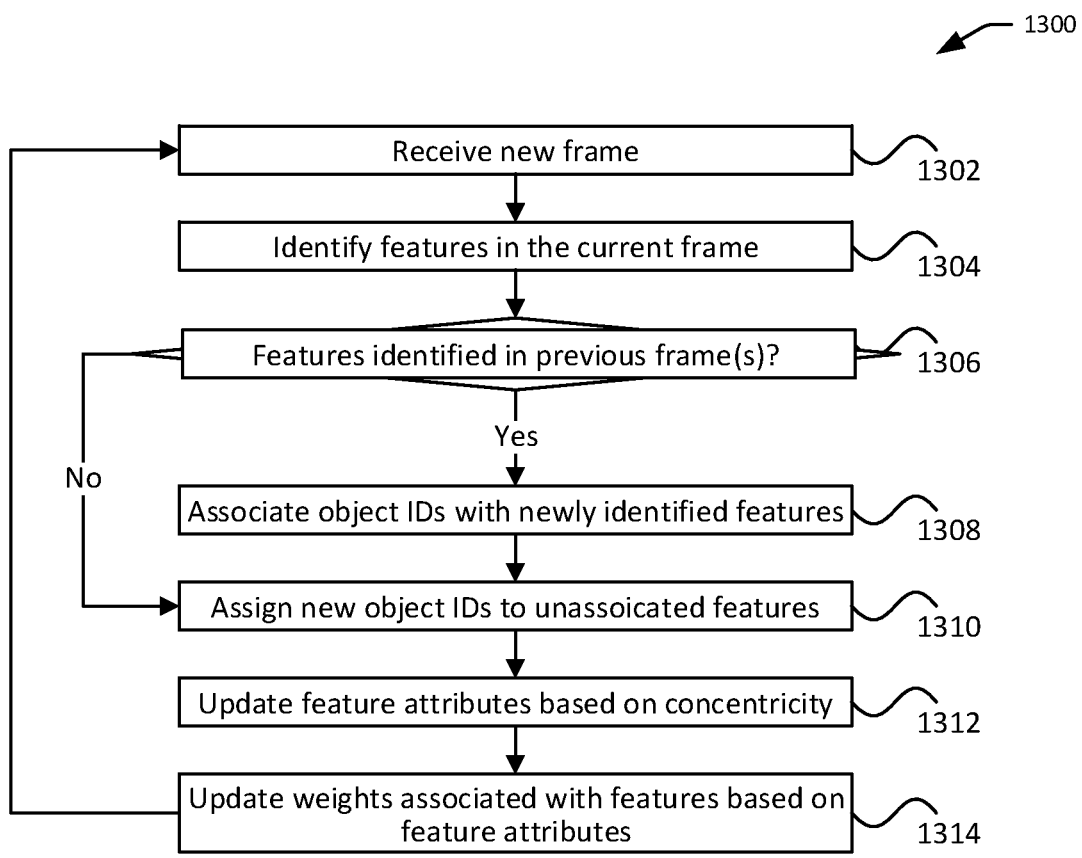
FIG. 13 illustrates another exemplary process for detecting a target marker, in accordance with embodiments.

FIG. 13 illustrates another exemplary process 1300 for detecting a target marker, in accordance with embodiments. Aspects of the process 1300 may be performed by one or more processors onboard and/or offboard a UAV.

At block 1302, a new frame of image is received as the current frame. The new image can include data that is generated by an imaging device carried by a UAV. The imaging device may be configured to generate frames of new images continuously or periodically.

At block 1304, the new image may be processed to identify features (e.g., rings) associated with the target marker. Feature identification may include detecting and extracting features. For example, the color images may be thresholded by designating a separate threshold for each color component or channel (e.g., red, green, or blue). Features may be extracted from the thresholded image. The extracted features may be analyzed to determine whether they belong to a certain class of shapes such as rings, for example, using Hough transform. A confidence score may be assigned to each feature to indicate the likelihood that the feature belongs to the class of shapes. Features with confidence scores below a certain threshold may be ignored or discarded.

At block 1306, it is determined whether any features detected in the current frame were identified in one or more previous frames, such as the last frame, or the last N frames where N is greater than 1. If it is determined that features were identified in the previous frames, then at block 1308, those previously-identified features are matched with the currently-identified features, if possible, so as to associate features corresponding to the same underlying object. The underlying object may be a marker or a marker component. Matching features share the same object identifier (ID). A newly-identified feature in the current frame is assigned the same object ID for a matching feature from a previous frame. The matching ID thus associates the newly-identified feature in the current frame with a matching feature in a previous frame. The matching or association of features across multiple frames may be based on various factors, as discussed in further detail in FIG. 14. If there are no previously-identified features (e.g., the current frame is the very first frame or no feature was identified in the previous frames) or if there are unmatched or unassociated newly-identified features in the current frame after block 1308, then at block 1310, the unassociated newly-identified features are assigned new object IDs that have not been assigned before.

At block 1312, attributes of the features are updated based at least in part on whether the features are concentric with each other. Feature attributes can include an object ID and a concentricity indicator indicating whether it is concentric with another feature. Additional examples of feature attributes can include an identifier of the frame for the feature, a position or size of the feature, and the like. Features with different object IDs are compared with each other to determine if they are concentric to each other. Concentric features may be assigned the same object ID. The concentricity indicator indicates whether a feature is concentric with at least one other feature. The concentricity indicator may be set to true for features determined to be concentric with other features; otherwise, the concentricity indicator may be set to false. The determination of concentricity is discussed further in FIG. 15.

At block 1314, weights associated features are updated based on at least in part on feature attributes. A weight indicates a likelihood that a feature is or is a part of the target marker. In some embodiments, a weight is associated with an object ID so features with the same object ID have the same weight. A higher weight may indicate that the associated feature or the associated object is more likely to include or be included in a target marker; and vice versa. In an alternative embodiment, the weight may indicate a likelihood that a feature is not or is not a part of the target marker. In such an embodiment, a higher weight may indicate that the associated feature is less likely to be the target marker; and vice versa. The weight may be represented by a number or an alphanumeric string.

Weight allocation among the features in a given frame may be based on predetermined weight allocation policies. The weight allocation policies may be preloaded to the UAV or transmitted to the UAV (e.g., as part of landing instructions). The weight allocation policies may be based on feature attributes such as relative feature sizes and concentricity indicators. The weight allocation policies may reflect different priorities given to different markers and/or different landing strategies to be implemented by the UAV. For instance, an exemplary landing policy may specify that higher weight is to be allocated to features that are concentric and/or are smaller in size. Given this weight allocation policy, the UAV is more likely to approach and land at the smallest ring of a concentric marker, which would be given the highest weight, rather than other bigger and/or non-concentric rings nearby, if any, which would be given lower weights. Another exemplary landing policy may specify that higher weight is to be allocated to features that the biggest in size and non-concentric. Given this weight allocation policy, the UAV is more likely to approach and land at a marker comprising a single large ring, which would be given the highest weight, rather than other smaller and/or concentric rings nearby, if any, which would be given lower weights.

In some embodiments, the process 1300 described above may be repeated for each newly acquired frame until the process 1300 is stopped. For example, the process 1300 may stop when the UAV has landed or when the imaging device stops taking new images.

Figure 14:
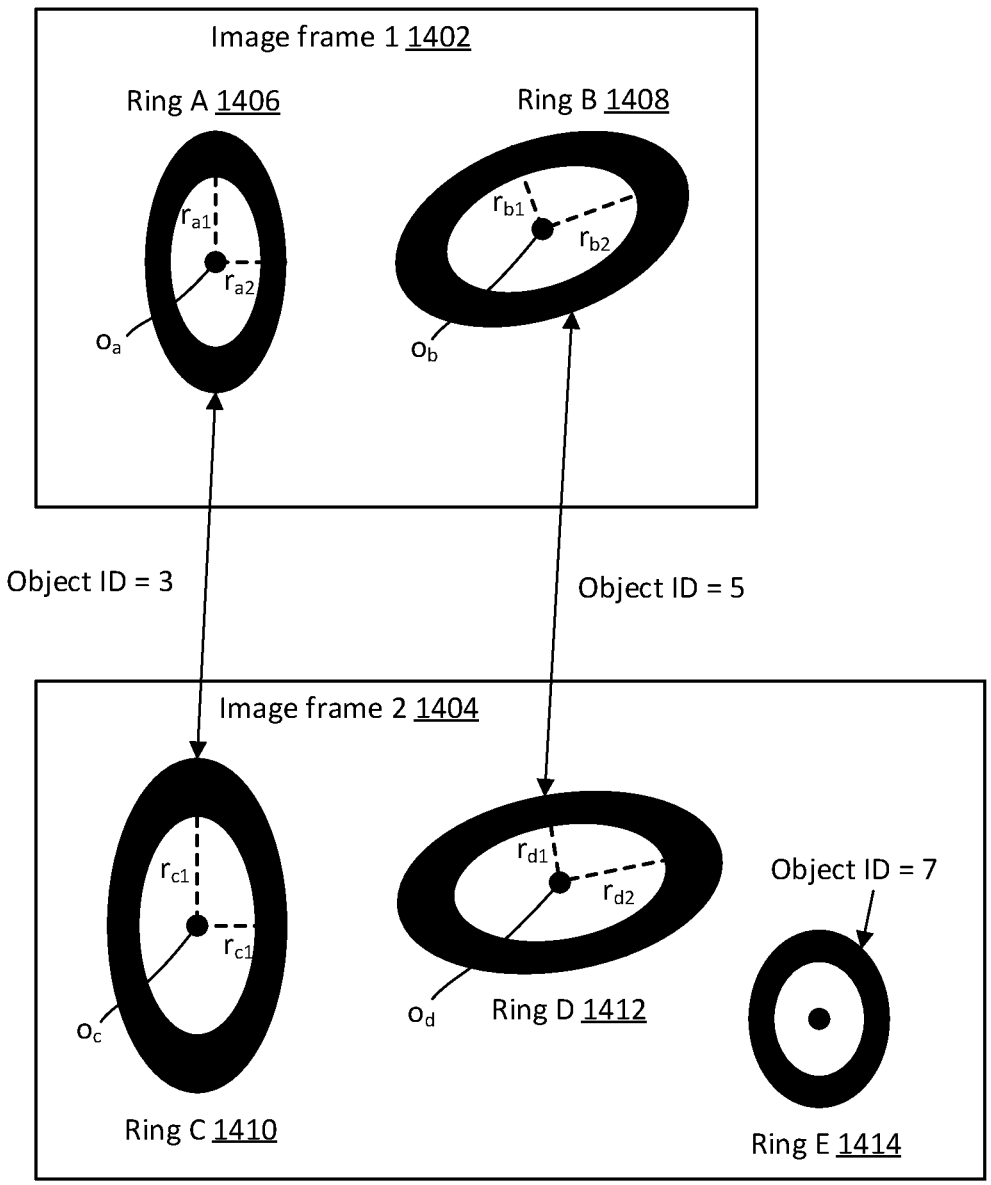
FIG. 14 illustrates an exemplary method for associating features in different frames, in accordance with embodiments.

FIG. 14 illustrates an exemplary method for associating features in different frames, in accordance with embodiments. The method may be implemented by one or more processors onboard and/or offboard a UAV. Two frames, frame 1 1402 and frame 2 1404, are illustrated. Frame 1 1402 may be generated before frame 2 1404. Two features have been identified in frame 1 1402, ring A 1406 and ring B 1408. Ring A 1406 is assigned an object ID, 3, and ring B 1408 is assigned a different object ID, 5. Three features have been identified in frame 2 1404, ring C 1410, ring D 1412, and ring E 1414. The features in frame 2 1404 and the features in frame 1 1402 are compared with each other to determine whether any feature in frame 2 1404 correspond to any feature in frame 1 1402. As illustrated, ring C 1410 and ring D 1412 in frame 2 1404 are determined to correspond respectively to ring A 1406 and ring B 1408 in frame 1 1402. As a result, ring C 1410 is assigned the same object ID, 3, that is associated with ring A 1406 and ring D 1412 is assigned the same object ID, 5, that is associated with ring B 1408. On the other hand, ring E 1414 does not correspond with any feature in frame 1 1402 and hence is assigned a new object ID 7, that is different from any of the existing object IDs.

Two features in two different frames may be considered a match when one or more criteria are satisfied. The criteria may be specified based on characteristics of the features. In some embodiments, the two features are considered a match when any of the criteria is satisfied. In some other embodiments, the two features are considered a match when all or a certain combination of the criteria are satisfied. In some embodiments, the criteria may be based on a distance between respective centers of the features, a comparison of respective perspectives of the features, and/or a comparison respective sizes of the features. Such exemplary criteria are illustrated below using ring A 1406 and ring C 1410 as an example.

Regarding the center distance criterion, the distance between the center $o_a$ of ring A 1406 and the center $o_c$ of ring C 1410 is determined. If the center distance is less than or equal to a predetermined threshold, then the center distance criterion is satisfied. Otherwise, the center distance criterion is not satisfied.

Regarding the perspective criterion, the respective perspectives of ring A 1406 and ring C 1410 may be compared. In an embodiment, a perspective of a ring can be expressed as a ratio between two axes (or two semi-axes) of a ring (e.g., an ellipse) such as a major axis and a minor axis. In some other embodiments, the perspective of a ring may be expressed in any other suitable formula. Note that the term ring is used broadly to cover any perception or transformation of a circular shape, such as an elliptical shape in an image that depicts the underlying ring viewed from a perspective. For example, the perspectives of ring A 1406 and ring C 1410 may be represented by ratios $$\frac{r_{a1}}{r_{a2}} \text{ and } \frac{r_{c1}}{r_{c2}},$$

respectively. The perspective criterion is satisfied only if the perspectives of two rings are similar (e.g., where the difference is below or equal to a given threshold). For example, the perspective criterion is satisfied for ring A 1406 and ring C 1410 when $$\frac{r_{a1}}{r_{a2}} \approx \frac{r_{c1}}{r_{c2}}.$$

Regarding the size criterion, the respective sizes of ring A 1406 and ring C 1410 may be compared. In an embodiment, a size of a ring can be expressed in terms of the two axes (or two semi-axes) of the ring such as a major axis and a minor axis. For example, the size of ring A 1406 and ring C 1410 may be represented by an average of the two semi-axes, $$\frac{r_{a1} + r_{a2}}{2} \text{ and } \frac{r_{c1} + r_{c2}}{2},$$

respectively. In some other embodiments, the size of a ring may be expressed in any other suitable formula, such as an area enclosed by the ring. The size criterion is satisfied only if the sizes of two rings are similar (e.g., where the difference is below or equal to a given threshold). For example, the size criterion is satisfied for ring A 1406 and ring C 1410 when $$\frac{r_{a1} + r_{a2}}{2} \approx \frac{r_{c1} + r_{c2}}{2}.$$

Applying the above-discussed criteria, ring B 1408 and ring D 1412 are also considered a match.

Figure 15:
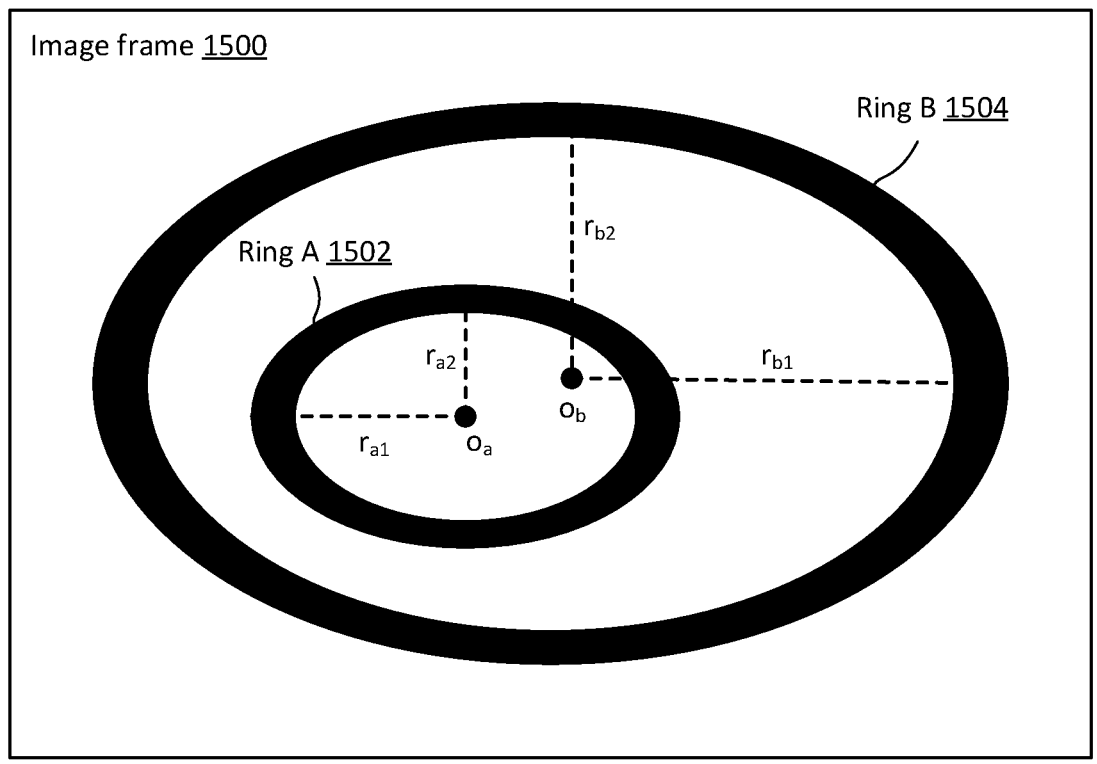
FIG. 15 illustrates an exemplary method for determining concentricity of features, in accordance with embodiments.

FIG. 15 illustrates an exemplary method for determining concentricity of features, in accordance with embodiments. The method can be used to determine whether two rings contained in an image frame 1500, ring A 1502 and ring B 1504, are concentric to each other. The method may be implemented by one or more processors onboard and/or offboard a UAV.

Two features may be considered concentric to each other when one or more criteria are satisfied. The criteria may be specified based on characteristics of the features. In some embodiments, the two features are considered concentric when any of the criteria is satisfied. In some other embodiments, the two features are considered concentric when all or a certain combination of the criteria are satisfied. In some embodiments, the criteria may be based on a distance between respective centers of the features, a comparison of respective perspectives of the features, and/or a comparison respective sizes of the features. Such exemplary criteria are illustrated below using ring A 1502 and ring B 1504 as an example.

Regarding the center distance criterion, the distance between the center $o_a$ of ring A 1502 and the center $o_b$ of ring B 1504 is determined. If the center distance is less than or equal to a threshold value, then the center distance criterion is satisfied. Otherwise, the center distance criterion is not satisfied. In some embodiments, the threshold value may be calculated based on attributes of the rings. For instance, the threshold value may be an average of the major and minor axes (or semi-axes) of the smaller ring A 1502, $$\frac{r_{a1} + r_{a2}}{2}.$$

Thus, the center distance criterion is satisfied only when the distance between $o_a$ and $o_b$ is less than or equal to $$\frac{r_{a1} + r_{a2}}{2}.$$

Regarding the perspective criterion, the respective perspectives of ring A 1502 and ring B 1504 may be compared. As discussed above, in an embodiment, a perspective of a ring can be expressed as a ratio between two axes (or two semi-axes) of a ring (e.g., an ellipse) such as a major axis and a minor axis. In some other embodiments, the perspective of a ring may be expressed in any other suitable formula. For example, the perspectives of ring A 1502 and ring B 1504 may be represented by ratios $$\frac{r_{a1}}{r_{a2}} \text{ and } \frac{r_{b1}}{r_{b2}},$$

respectively. The perspective criterion is satisfied only if the perspectives of two rings are similar (e.g., where the difference is below or equal to a given threshold). For example, the perspective criterion is satisfied for ring A 1502 and ring B 1504 when $$\frac{r_{a1}}{r_{a2}} \approx \frac{r_{b1}}{r_{b2}}.$$

Regarding the size criterion, the respective sizes of ring A 1502 and ring C 1504 may be compared. As discussed above, in an embodiment, a size of a ring can be expressed in terms of the two axes (or two semi-axes) of the ring such as a major axis and a minor axis. For example, the size of ring A 1502 and ring B 1504 may be represented by an average of the two semi-axes, $$\frac{r_{a1} + r_{a2}}{2} \text{ and } \frac{r_{b1} + r_{b2}}{2},$$

respectively. In some other embodiments, the size of a ring may be expressed in any other suitable formula, such as an area enclosed by the ring. The size criterion is satisfied only if the size of one ring is less than the size of the other ring, for example, when $$\frac{r_{a1} + r_{a2}}{2} < \frac{r_{b1} + r_{b2}}{2}.$$

Once above criteria are satisfied, ring A 1502 and ring B 1504 are determined to be concentric with each other. The concentricity indicators for both ring A 1502 and ring B 1504 can be set to true. Advantageously, the concentricity indicators associated with the rings can ensure that, even if only one of the two rings is detected in a subsequent image, the one ring can be determined to be concentric based on its concentricity indicator without detecting the other ring. That is, once the rings are determined to be concentric, the concentricity attribute propagate with the rings through future images. It is no longer necessary for both rings to be detected in the same image frame in order to determine that they are concentric. In some embodiments, the object IDs for a concentric set of rings are set to be the same indicating the same underlying marker. In other embodiments, the object IDs for the concentric rings may be different.

Figure 16:
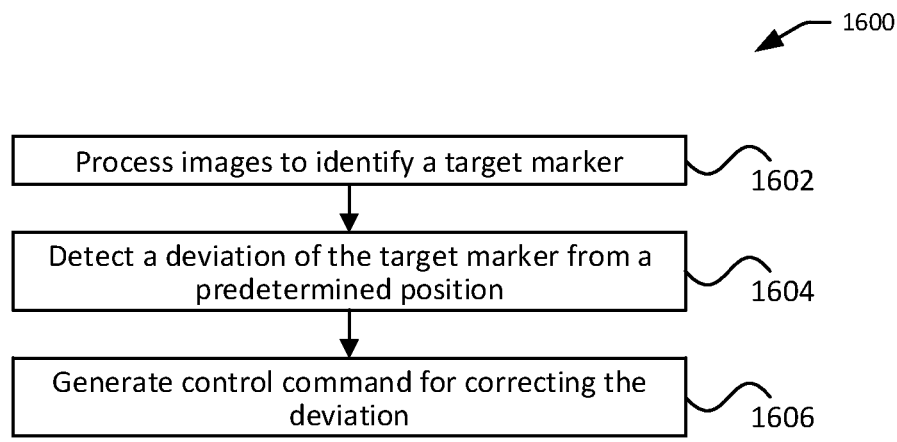
FIG. 16 illustrates an exemplary process for tracking a target marker using an imaging device, in accordance with embodiments.

FIG. 16 illustrates an exemplary process 1600 for tracking a target marker using an imaging device, in accordance with embodiments. Specifically, the process 1600 may be used to track a target marker using an imaging device carried by a UAV. Aspects of process 1600 may be implemented by one or more processors onboard and/or offboard the UAV.

At block 1602, one or more images can be processed to identify a target marker. The one or more images are generated by the imaging device. The target marker can include a landing marker, a heading marker, and/or a security marker. The target marker may be identified using any suitable target identification techniques such as those discussed in FIGS. 12-15. The current information of the target marker may be generated including the current position, size, and other characteristics of the identified target marker. The current position may be the position of a center of target marker within a field of view of the imaging device or the pixel position of the target marker within an image taken by the imaging device. The current size may be the size of the target marker within a field of view of the imaging device or the pixel size of the target marker within an image taken by the imaging device.

At block 1604, a deviation of the target marker from a predetermined position may be detected. The predetermined position (also referred to as an expected position) may be a position within a field of view or an image of the imaging device. The predetermined position may be a position at or close to which the target is to be maintained. For example, the predetermined position may be the center of the field of view. A deviation from such a predetermined position can be determined by comparing the difference between the current position and the predetermined position. In some embodiments, a deviation is determined to exist only if the difference exceeds a predetermined threshold.

At block 1606, control commands can be generated to correct the deviation. Correcting the deviation includes reducing the difference between the actual position of the target marker and the predetermined position. Correcting the deviation may also include reducing the difference in size between the actual and the predetermined sizes of the target marker. The control commands can be generated in response to the deviation detected in block 1604. The control commands may be used to control a state of a carrier and/or a state of the UAV such as one or more angular velocities.

Figure 17:
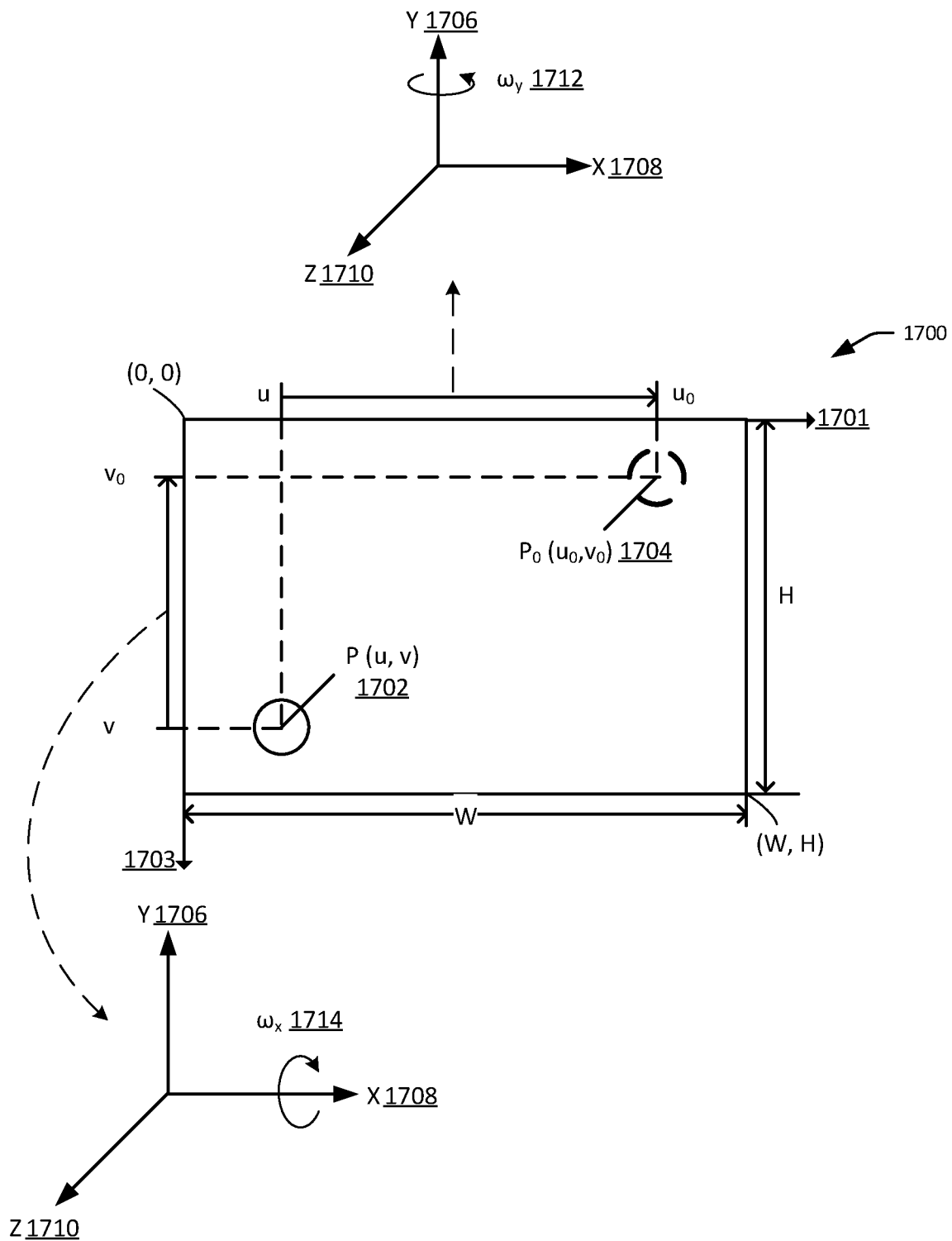
FIG. 17 illustrates an exemplary method for maintaining a target at a predetermined position, in accordance with embodiments.

FIG. 17 illustrates an exemplary method for maintaining a predetermined position of a target within an image 1700, in accordance with embodiments. The image may be captured by a payload such as an imaging device. The payload may be coupled to a carrier that allows the payload to move relative to the carrier with respect to up to three axes of freedom, as described herein. Assume that the image has a width of W pixels and a height of H pixels (where W and H are positive integers). A position within the image can be defined by a pair of coordinates along a horizontal axis 801 (along the width of the image) and a vertical axis 1703 (along the height of the image), where the upper left corner of image has coordinates (0, 0) and the lower right corner of the image has coordinates (W, H).

Assume that a target, as captured in the image 1700, is located at position P (u, v) 1702, and the expected position of the target is $P_0$ ($u_0$, $v_0$) 1704 that is different from P 1702. In some embodiments, the expected position of the target $P_0$ ($u_0$, $v_0$) may be near the center of the image, such that $u_0=W/2$, and/or $v_0=H/2$. In other embodiment, the expected position of the target may be located anywhere else within the image (e.g., off-center). In various embodiments, the expected position of the target may or may not be the same as the initial position of the target. Assuming that the current position P is deviated from the expected position $P_0$ such that the deviation exceeds a predetermined threshold (such as expressed by a $\Delta x$ from $u_0$, and a $\Delta y$ from $v_0$), then an adjustment is required to bring the target position from P to close to the expected position $P_0$.

In some embodiments, the deviation from the expected target position can be used to derive one or more angular velocities for rotating the field of view of the imaging device (e.g., image sensor) around one or more axes. For example, deviation along the horizontal axis 1701 of the image (e.g., between u and $u_0$) may be used to derive an angular velocity $\omega_Y$ 1712 for rotating the field of view of the imaging device around the Y (yaw) axis 1706, as follows:

$$\omega_Y = \alpha * (u - u_0), \text{ where } \alpha \in \mathbb{R} \text{ (real numbers)} \quad (1)$$

The rotation around the Y axis for the field of view of an imaging device may be achieved by a rotation of the payload (via the carrier). In the equation (1), $\alpha$ is a constant that may be predefined and/or calibrated based on the configuration of the carrier. In some embodiments, $\alpha$ is greater than zero ($\alpha>0$). In other embodiments, $\alpha$ may be no greater than zero ($\alpha \leq 0$). In some embodiments, a can be used to map a calculated pixel value to a corresponding control lever amount or sensitivity for controlling the angular velocity around a certain axis (e.g., yaw axis). In general, the control lever may be used to control the angular or linear movement of a controllable object (e.g., the carrier). Greater control lever amount corresponds to greater sensitivity and greater speed (for angular or linear movement). In some embodiments, the control lever amount or a range thereof may be determined by configuration parameters of a control system for the carrier. The upper and lower bounds of the range of the control lever amount may include any arbitrary numbers. For example, the range of the control lever amount may be (1000, −1000) for one control system and (−1000, 1000) for another control system.

As an example, assume that the images have a width of W=1024 pixels and a height of H=768 pixels. Thus, the size of the images is 1024*768. Further assume that the expected position of the target has a $u_0=512$. Thus, $(u−u_0) \in (−512, 512)$. Assume that the range of the control lever amount around the yaw axis is (−1000, 1000), then the maximum control lever amount or maximum sensitivity is 1000 and $\alpha=1000/512$. Thus, the value of a can be affected by image resolution or size provided by the imaging device, range of the control lever amount (e.g., around a certain rotation axis), the maximum control lever amount or maximum sensitivity, and/or other factors.

As illustrated herein, the direction of the rotation around the Y (yaw) axis may depend on the sign of $u−u_0$. For instance, if the expected position is located to the right of the actual position (as illustrated in FIG. 17), then $u−u_0<0$, and the field of view needs to rotate in a counter-clockwise fashion around the yaw axis 1706 (e.g., pan left) in order to bring the target to the expected position. On the other hand, if the expected position is located to the left of the actual position, then $u−u_0>0$, and the field of view needs to rotate in a clockwise fashion around the yaw axis 1706 (e.g., pan right) in order to bring the target to the expected position.

As illustrated herein, the speed of rotation (e.g., absolute value of the angular velocity) around a given axis (e.g., the Y (yaw) axis) may depend on the distance between the expected and the actual position of the target along the axis (i.e., $|u−u_0|$). The further the distance is, the greater the speed of rotation. Likewise, the closer the distance is, the slower the speed of rotation. When the expected position coincides with the position of the target along the axis (e.g., $u=u_0$), then the speed of rotation around the axis is zero and the rotation stops.

The method for adjusting the deviation from the expected target position and the actual target position along the horizontal axis 1701, as discussed above, can be applied in a similar fashion to correct the deviation of the target along a different axis 1703. For example, deviation along the vertical axis 1703 of the image (e.g., between v and $v_0$) may be used to derive an angular velocity $\omega_X$ 1714 for the field of view of the imaging device around the X (pitch) axis 1708, as follows:

$$\omega_X = \beta * (v − v_0), \text{ where } \beta \in \mathbb{R} \quad (2)$$

The rotation around the X axis for the field of view of an imaging device may be achieved by a rotation of the payload (via a carrier). Hence, in the equation (2), $\beta$ is a constant that may be predefined and/or calibrated based on the configuration of the carrier. In some embodiments, $\beta$ is greater than zero ($\beta>0$). In other embodiments, $\beta$ may be no greater than zero ($\beta \leq 0$). In some embodiments, $\beta$ can be used to map a calculated pixel value to a corresponding control lever amount for controlling the angular velocity around a certain axis (e.g., pitch axis). In general, the control lever may be used to control the angular or linear movement of a controllable object (e.g., carrier). Greater control lever amount corresponds to greater sensitivity and greater speed (for angular or linear movement). In some embodiments, the control lever amount or a range thereof may be determined by configuration parameters of a carrier control system for a carrier. The upper and lower bounds of the range of the control lever amount may include any arbitrary numbers. For example, the range of the control lever amount may be (1000, −1000) for one control system and (−1000, 1000) for another control system.

Continue with the above example where the images have a width of W=1024 pixels and a height of H=768 pixels, assume that the expected position of the target has a $v_0=384$. Thus, $(v−v_0) \in (−384, 384)$. Also assume that the range of the control lever amount around the pitch axis is (−1000, 1000), then the maximum control lever amount or maximum sensitivity is 1000 and $\beta=1000/384$. Thus, the value of $\beta$ can be affected by image resolution or size provided by the imaging device, range of the control lever amount (e.g., around a certain rotation axis), the maximum control lever amount or maximum sensitivity, and/or other factors.

As illustrated herein, the direction of the rotation around the X (yaw) axis may depend on the sign of $v−v_0$. For instance, if the expected position is located above of the actual position (as illustrated in FIG. 17), then $v−v_0>0$, and the field of view needs to rotate in a clockwise fashion around the pitch axis 1708 (e.g., pitch down) in order to bring the target to the expected position. On the other hand, if the expected position is located to below the actual position, then $v−v_0<0$, and the field of view needs to rotate in a counter-clockwise fashion around the pitch axis 1708 (e.g., pitch up) in order to bring the target to the expected position.

As illustrated herein, the speed of rotation (e.g., absolute value of the angular velocity) depends on the distance between the expected and the actual position of the target (i.e., $|v-v_0|$) along a give axis (e.g., the X (pitch) axis). The further the distance is, the greater the speed of rotation. The closer the distance is, the slower the speed of rotation. When the expected position coincides with the position of the target (e.g., $v=v_0$), then the speed of rotation is zero and the rotation stops.

In some embodiments, the values of the angular velocities as calculated above may be constrained or otherwise modified by various constraints of the system. Such constraints may include the maximum and/or minimum speed that may be achieved by the carrier, the range of control lever amount or the maximum control lever amount or maximum sensitivity of the control system for the carrier, and the like. For example, the rotation speed may be the minimum of the calculated rotation speed and the maximum speed allowed.

In some embodiments, the control for the carrier and/or UAV may be implemented using a control loop feedback such as a PID controller. The PID controller can be configured to calculate an error value as the difference between the current target state (e.g., current target position) and an expected target state (e.g., expected target position), and to minimize the error over time by adjusting a control variable (e.g., an angular velocity). For instance, the pitch angular velocity or speed of the carrier can be controlled to maintain the marker center near the image center using the following formula:

carrier_pitch_angular_rate = carrier_P ∗ (marker_center_y − image_center_y) + carrier_D ∗ (error − error_last)

In the above formula, carrier_P is the proportional term and carrier_D is the derivative term. For carrier_P, error=marker_center_y−image_center_y, that is, the error is the distance between the y coordinate of the marker center (marker_cetner_y) and the y coordinate of the image center (image_center_y). The greater the distance, the larger the carrier pitch angular rate, until the marker is at the image center. For carrier_D, the term error−error_last is the difference between the current proportional term and the proportional term for the last frame. This term can be used to prevent over-modulation of the carrier.

In some embodiments, the target marker can be tracked using the tracking control described herein while the UAV is controlled horizontally and/or vertically to approach the target marker. Tracking the target marker can reduce the likelihood of losing sight of the target and can improve the accuracy and efficiency of landing the UAV.

Figure 18:
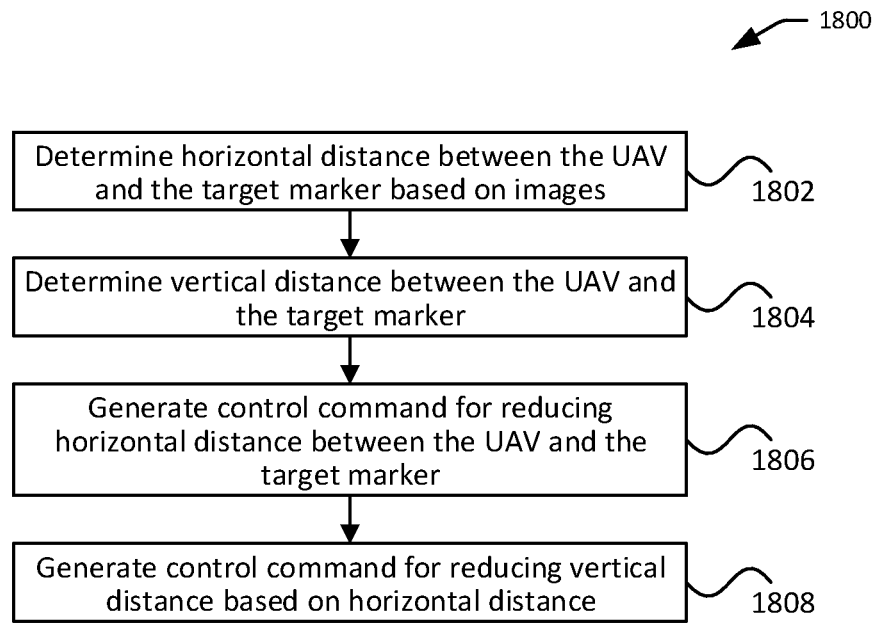
FIG. 18 illustrates an exemplary process for controlling a UAV to approach a target marker, in accordance with embodiments.

FIG. 18 illustrates an exemplary process 1800 for controlling a UAV to approach a target marker, in accordance with embodiments. Aspects of process 1800 can be implemented by one or more processors onboard and/or offboard the UAV.

At block 1802, a horizontal distance between the UAV and the target marker is determined based on the images generated by the imaging device. The images can be processed to identify the target marker. The location the marker center can be determined as the landing location of the UAV.

In some embodiments, the location of the marker center in a coordinate system of the imaging device (also referred to as the camera coordinate system) can be determined from the location of the marker center in the images based at least in part on parameters of the camera (e.g., focal length) as described below.

In a camera coordinate system (also referred to as a camera reference frame), three orthogonal axes, X, Y, and Z intersects at the optical center of the imaging device. The Z axis is the optical axis of the imaging device. The image plane is located f units along the optical axis from the optical center, where f is the focal length of the imaging device. An object with 3D coordinates ($x_c$, $y_c$, $z_c$) in the camera coordinate system is projected onto the image plane and is represented by pixel coordinates (u, v). The following equations are true under a pinhole camera model:

$$u = f * \frac{x_c}{z_c}$$

$$v = f * \frac{y_c}{z_c}$$

The coordinates of the marker center in the camera coordinate system can be transformed into coordinates in a UAV coordinate system based at least in part on the spatial relationship (e.g., rotational and/or translational transformation) between the imaging device and the UAV (and hence the coordinate systems thereof). In a UAV coordinate system, three orthogonal axis X, Y, and Z intersects at the center of the UAV (e.g., center of gravity or geometric center), where the Z axis is the vertical (yaw) axis, X axis is lateral (pitch) axis and Y axis is the longitudinal (roll) axis. Assume the marker center's coordinates in the UAV coordinate system is ($x_b$, $y_b$, $z_b$), where $z_b$ represents the vertical distance between UAV and the marker center, and $x_b$ and $y_b$ represent horizontal components between the UAV and the marker center along the X and Y axes, respectively. Given a pitch angle θ between the camera coordinate system and the UAV coordinate system, the following equations can be combined with the equations above to derive the marker center's coordinates ($x_b$, $y_b$, $z_b$) under the UAV coordinate system:

$y_c = y_b * \cos θ − z_b * \sin θ$ $z_c = z_b * \cos θ + y_b * \sin θ$

Similarly, given a yaw angle φ angle between the camera coordinate system and the UAV coordinate system, the following equations can be combined with the equations above to derive the marker center's coordinates ($x_b$, $y_b$, $z_b$) under the UAV coordinate system:

$x_c = x_b * \cos θ − z_b * \sin θ$ $z_c = z_b * \cos θ + x_b * \sin θ$

In some embodiments, the coordinates of the marker center in the camera coordinate system can be transformed into a third coordinate system (e.g., world coordinate system), which may then be transformed into the UAV coordinate system based on the relationship (e.g., rotation and/or translation) between the UAV coordinate system and the third coordinate system. A spatial relationship (e.g. horizontal distance and/or vertical distance) between the marker and the UAV can then be determined based on the coordinates of the marker center in the UAV coordinate system.

At block 1804, the vertical distance between the UAV and the target marker is determined. In some embodiments, the vertical distance (or altitude) between UAV and the marker center, $z_b$, can be determined using one or more sensors onboard the UAV, such as an ultrasound sensor, a lidar sensor, a barometer, a vision sensor (e.g., stereovision camera), a GPS sensor, or any combinations thereof. In some other embodiments, $z_b$ may be determined based on the images of the marker obtained by the imaging device, for example, by comparing the detected size of the marker and the actual size of the marker (if known).

At block 1806, one or more control commands are generated for reducing the horizontal distance between the UAV and the target marker. For example, in an embodiment, the horizontal velocities $v_x$ (horizontal velocity along the X axis of the UAV) and $v_y$ (horizontal velocity along the Y axis of the UAV) can be controlled using the horizontal control commands. The control commands may be generated by a PID controller, which can use horizontal deviations ($x_b$, $y_b$) between the UAV and the marker as feedback values:

$$v_x = v_{x\_P} * x_b + v_{x\_D} * (x_b - x_{b\_\text{last}})$$

$$v_y = v_{y\_P} * y_b + v_{y\_D} * (y_b - y_{b\_\text{last}})$$

At block 1808, one or more control commands are generated for reducing the vertical distance between the UAV and the target marker based on the horizontal distance. In an embodiment, the vertical velocity, $v_z$, along the Z (vertical) axis of UAV may be negatively correlated to the horizontal distance, which may be represented by $x_b$, $y_b$, or a combination thereof. The negative correlation may be linear (as shown below). For example, the vertical velocity of the UAV may be calculated as follows:

$$v_z = v_{max} - |x_b| - |y_b|$$

Alternatively, the negative correlation may be non-linear. For example, the vertical velocity of the UAV may be calculated as follows:

$$v_z = v_{max} - \min(v_{max}, \sqrt{|x_b|^2 + |y_b|^2})$$

In the above equations, the farther the UAV deviates from the marker (the larger $|x_b|$ and $|y_b|$), the slower the UAV descends. The UAV starts descending faster when the horizontal deviation gets closer to zero (i.e., when the UAV is closer to directly above the marker). The vertical velocity may be capped by a maximum velocity $v_{max}$ (e.g., 0.1 m/s, 0.2 m/s, 0.4 m/s, 1 m/s, 2 m/s). The maximum velocity may be predetermined based on characteristics of the UAV and/or the environment. On the other hand, the vertical velocity may be kept at zero (i.e., not descending) when the horizontal deviation is equal to or exceeds the maximum velocity (i.e., $|x_b| + |y_b| \geq v_{max}$, or $\sqrt{|x_b|^2 + |y_b|^2} \geq v_{max}$). Advantageously, the negative correlation between the horizontal deviation of the UAV and the vertical velocity ensures a more gradual descend of the UAV when the UAV is farther from the marker and a more precipitous descend when the UAV is directly above or close to directly above the UAV. Such an approach can allow the UAV to approach the target marker horizontally and vertically at substantially the same time while ensuring safety of the UAV and improving landing accuracy.

Figure 19:
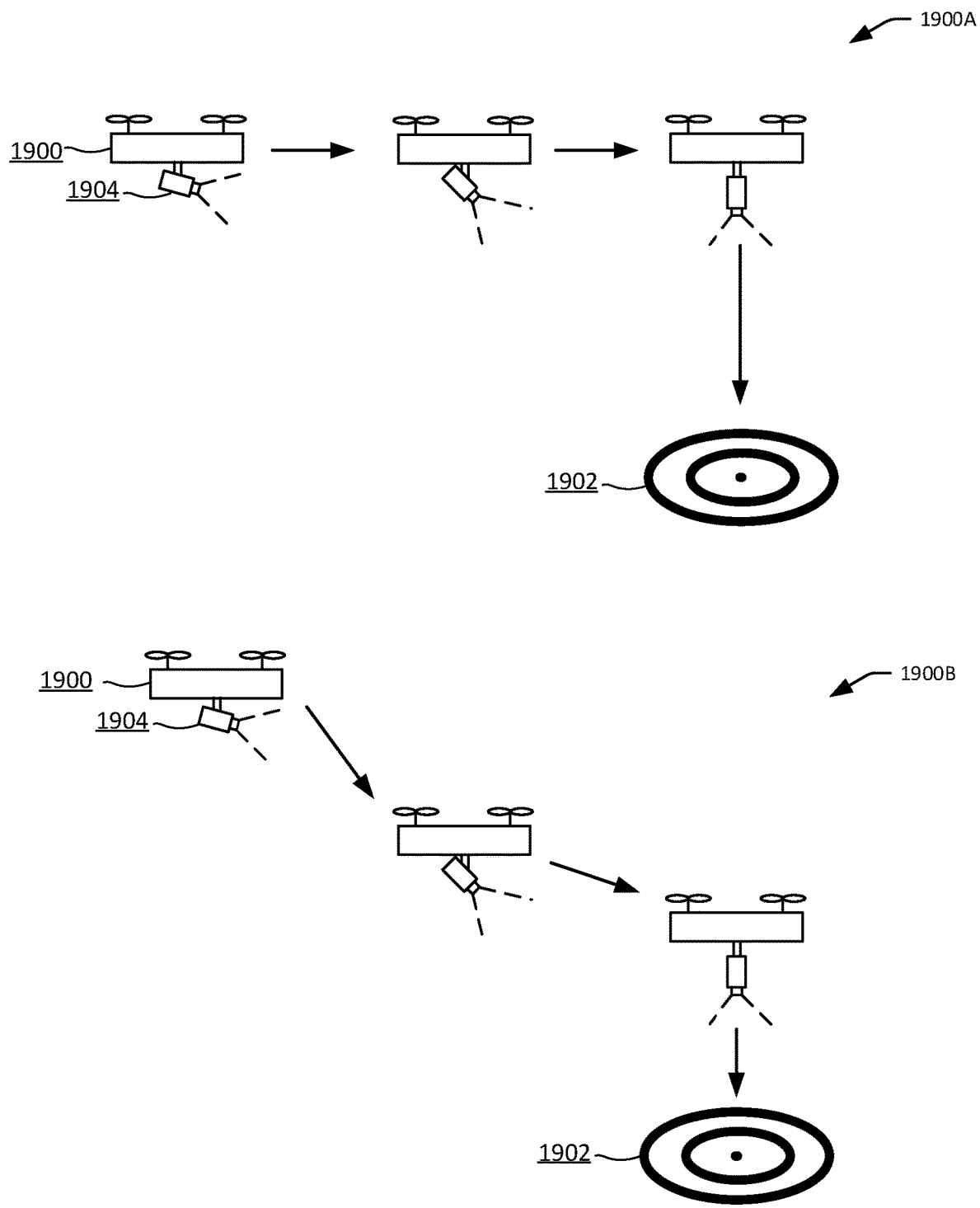
FIG. 19 illustrates exemplary methods for landing a UAV, in accordance with embodiments.

FIG. 19 illustrates exemplary methods for landing a UAV 1900, in accordance with embodiments. In some embodiments, such as illustrated in process 1900A, the UAV 1900 be controlled to horizontally approach the target marker 1902 until the UAV 1900 is directly above or almost directly above the target center (e.g., when the horizontal deviation between the UAV and the marker center is equal or less than a threshold). The UAV 1900 can then be controlled to descend vertically to land at the target marker 1902. In some other embodiments, such as illustrated in process 1900B, the UAV 1900 be controlled to approach the target marker 1902 both horizontally and vertically at substantially the same time. When the UAV 1900 is directly above or almost directly above the target center (e.g., when the horizontal deviation between the UAV and the marker center is equal or less than a threshold), the UAV can then be controlled to descend vertically to land at the target marker 1900. The landing time may be shortened in the latter approach. In both approaches, an imaging device 1904 can be controlled to track the target marker 1902 while the UAV 1900 is controlled to approach the marker 1902. In some embodiments, at some point before landing (e.g., when the UAV 1900 is directly or almost directly above the target center), UAV 1900 may be controlled to rotate its heading according to a heading marker (not shown).

Variations of the above embodiments are also within the scope of the disclosure. For example, more than one imaging devices may be by the UAV to track a target marker. The multiple imaging device may be positioned in a certain configuration so as to maximize their collective field of view.

The systems, devices, and methods described herein can be applied to a wide variety of movable objects. As previously mentioned, any description herein of an aerial vehicle, such as a UAV, may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$3, 1 $m^3$, or 10 $m^3$. Conversely, the total volume of the movable object may be greater than or equal to about: 1 $cm^3$, 2 $cm^3$, 5 $cm^3$, 10 $cm^3$, 20 $cm^3$, 30 $cm^3$, 40 $cm^3$, 50 $cm^3$, 60 $cm^3$, 70 $cm^3$, 80 $cm^3$, 90 $cm^3$, 100 $cm^3$, 150 $cm^3$, 200 $cm^3$, 300 $cm^3$, 500 $cm^3$, 750 $cm^3$, 1000 $cm^3$, 5000 $cm^3$, 10,000 $cm^3$, 100,000 $cm^3$, 1 $m^3$, or 10 $m^3$.

In some embodiments, the movable object may have a footprint (which may refer to the lateral cross-sectional area encompassed by the movable object) less than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$. Conversely, the footprint may be greater than or equal to about: 32,000 $cm^2$, 20,000 $cm^2$, 10,000 $cm^2$, 1,000 $cm^2$, 500 $cm^2$, 100 $cm^2$, 50 $cm^2$, 10 $cm^2$, or 5 $cm^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

The UAV can include a propulsion system having four rotors. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length. For example, the length can be less than or equal to 2 m, or less than equal to 5 m. In some embodiments, the length can be within a range from 40 cm to 1 m, from 10 cm to 2 m, or from 5 cm to 5 m. Any description herein of a UAV may apply to a movable object, such as a movable object of a different type, and vice versa.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 20:
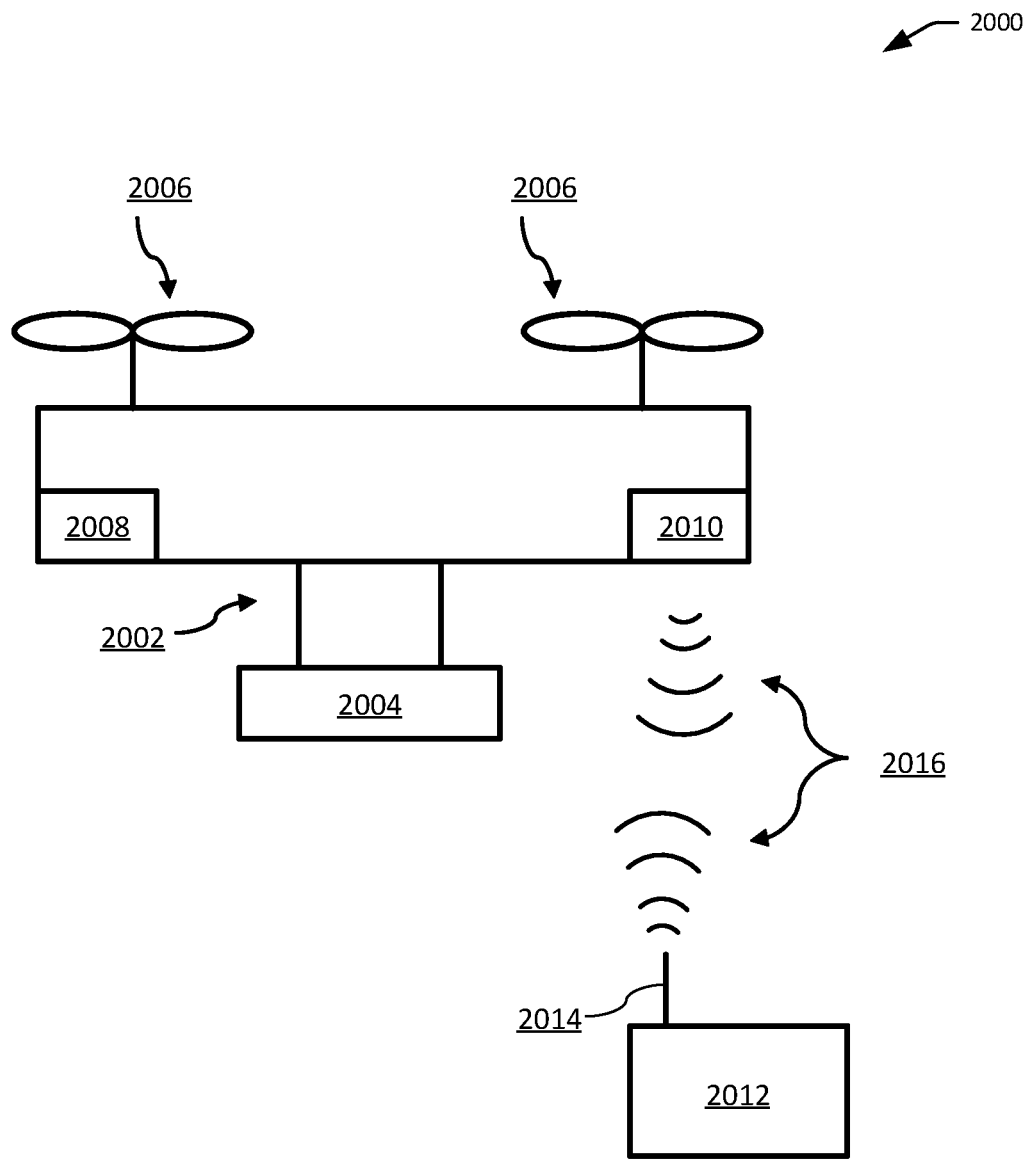
FIG. 20 illustrates a movable object including a carrier and a payload, in accordance with embodiments.

FIG. 20 illustrates a movable object 2000 including a carrier 2002 and a payload 2004, in accordance with embodiments. Although the movable object 2000 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 2004 may be provided on the movable object 2000 without requiring the carrier 2002. The movable object 2000 may include propulsion mechanisms 2006, a sensing system 2008, and a communication system 2010.

The propulsion mechanisms 2006 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 2006 can be mounted on the movable object 2000 using any suitable means, such as a support element (e.g., a drive shaft) as described elsewhere herein. The propulsion mechanisms 2006 can be mounted on any suitable portion of the movable object 2000, such on the top, bottom, front, back, sides, or suitable combinations thereof.

In some embodiments, the propulsion mechanisms 2006 can enable the movable object 2000 to take off vertically from a surface or land vertically on a surface without requiring any horizontal movement of the movable object 2000 (e.g., without traveling down a runway). Optionally, the propulsion mechanisms 2006 can be operable to permit the movable object 2000 to hover in the air at a specified position and/or orientation. One or more of the propulsion mechanisms 2000 may be controlled independently of the other propulsion mechanisms. Alternatively, the propulsion mechanisms 2000 can be configured to be controlled simultaneously. For example, the movable object 2000 can have multiple horizontally oriented rotors that can provide lift and/or thrust to the movable object. The multiple horizontally oriented rotors can be actuated to provide vertical takeoff, vertical landing, and hovering capabilities to the movable object 2000. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 2000 (e.g., with respect to up to three degrees of translation and up to three degrees of rotation).

The sensing system 2008 can include one or more sensors that may sense the spatial disposition, velocity, and/or acceleration of the movable object 2000 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 2008 can be used to control the spatial disposition, velocity, and/or orientation of the movable object 2000 (e.g., using a suitable processing unit and/or control module, as described below). Alternatively, the sensing system 2008 can be used to provide data regarding the environment surrounding the movable object, such as weather conditions, proximity to potential obstacles, location of geographical features, location of manmade structures, and the like.

The communication system 2010 enables communication with terminal 2012 having a communication system 2014 via wireless signals 2016. The communication systems 2010, 2014 may include any number of transmitters, receivers, and/or transceivers suitable for wireless communication. The communication may be one-way communication; such that data can be transmitted in only one direction. For example, one-way communication may involve only the movable object 2000 transmitting data to the terminal 2012, or vice-versa. The data may be transmitted from one or more transmitters of the communication system 2010 to one or more receivers of the communication system 2012, or vice-versa. Alternatively, the communication may be two-way communication, such that data can be transmitted in both directions between the movable object 2000 and the terminal 2012. The two-way communication can involve transmitting data from one or more transmitters of the communication system 2010 to one or more receivers of the communication system 2014, and vice-versa.

In some embodiments, the terminal 2012 can provide control data to one or more of the movable object 2000, carrier 2002, and payload 2004 and receive information from one or more of the movable object 2000, carrier 2002, and payload 2004 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 2006), or a movement of the payload with respect to the movable object (e.g., via control of the carrier 2002). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 2008 or of the payload 2004). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 2012 can be configured to control a state of one or more of the movable object 2000, carrier 2002, or payload 2004. Alternatively or in combination, the carrier 2002 and payload 2004 can also each include a communication module configured to communicate with terminal 2012, such that the terminal can communicate with and control each of the movable object 2000, carrier 2002, and payload 2004 independently.

In some embodiments, the movable object 2000 can be configured to communicate with another remote device in addition to the terminal 2012, or instead of the terminal 2012. The terminal 2012 may also be configured to communicate with another remote device as well as the movable object 2000. For example, the movable object 2000 and/or terminal 2012 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 2000, receive data from the movable object 2000, transmit data to the terminal 2012, and/or receive data from the terminal 2012. Optionally, the remote device can be connected to the Internet or other telecommunications network, such that data received from the movable object 2000 and/or terminal 2012 can be uploaded to a website or server.

Figure 21:
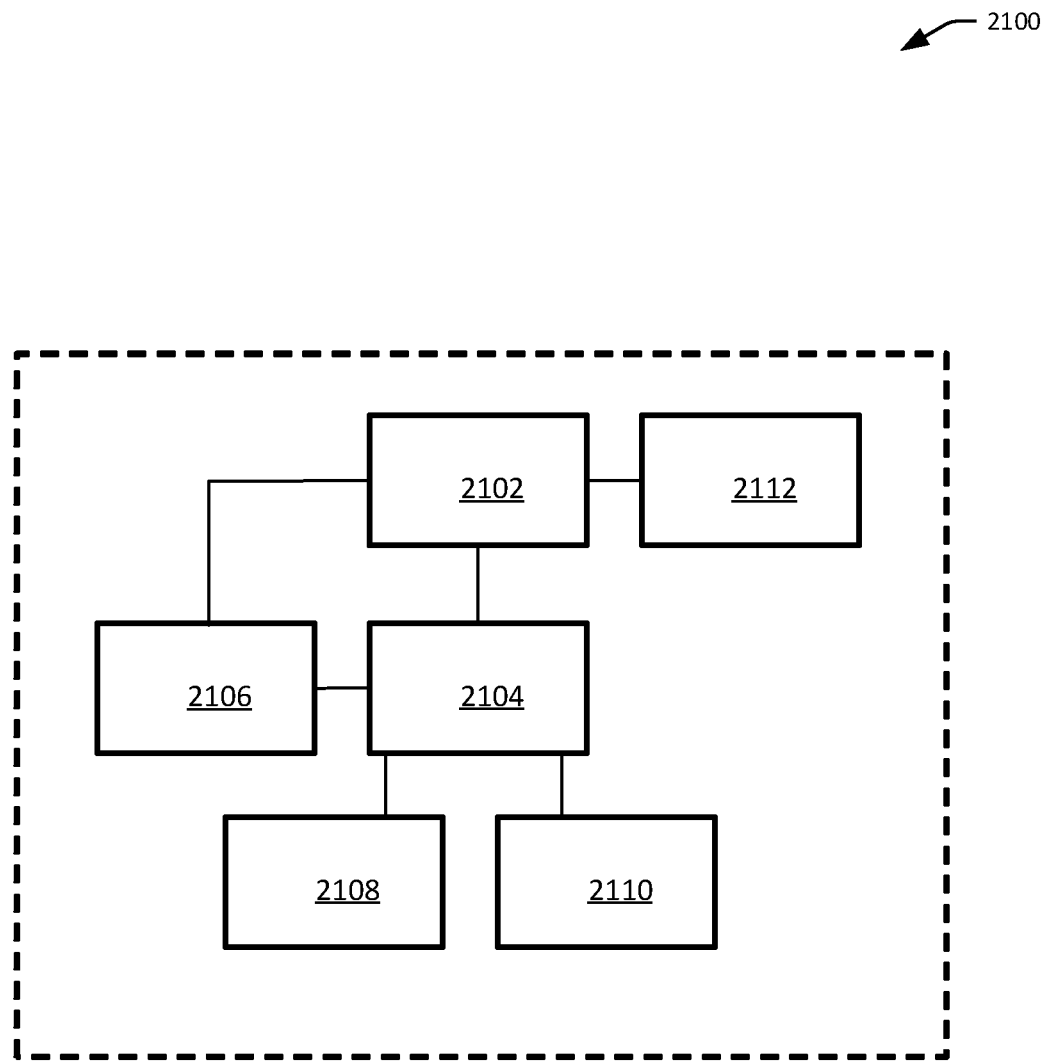
FIG. 21 is a schematic illustration by way of block diagram of a system for controlling a movable object, in accordance with embodiments.

FIG. 21 is a schematic illustration by way of block diagram of a system 2100 for controlling a movable object, in accordance with embodiments. The system 2100 can be used in combination with any suitable embodiment of the systems, devices, and methods disclosed herein. The system 2100 can include a sensing module 2102, processing unit 2104, non-transitory computer readable medium 2106, control module 2108, and communication module 2110.

The sensing module 2102 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 2102 can be operatively coupled to a processing unit 2104 having a plurality of processors. In some embodiments, the sensing module can be operatively coupled to a transmission module 2112 (e.g., a Wi-Fi image transmission module) configured to directly transmit sensing data to a suitable external device or system. For example, the transmission module 2112 can be used to transmit images captured by a camera of the sensing module 2102 to a remote terminal.

The processing unit 2104 can have one or more processors, such as a programmable processor (e.g., a central processing unit (CPU)). The processing unit 2104 can be operatively coupled to a non-transitory computer readable medium 2106. The non-transitory computer readable medium 2106 can store logic, code, and/or program instructions executable by the processing unit 2104 for performing one or more steps. The non-transitory computer readable medium can include one or more memory units (e.g., removable media or external storage such as an SD card or random access memory (RAM)). In some embodiments, data from the sensing module 2102 can be directly conveyed to and stored within the memory units of the non-transitory computer readable medium 2106. The memory units of the non-transitory computer readable medium 2106 can store logic, code and/or program instructions executable by the processing unit 2104 to perform any suitable embodiment of the methods described herein. The memory units can store sensing data from the sensing module to be processed by the processing unit 2104. In some embodiments, the memory units of the non-transitory computer readable medium 2106 can be used to store the processing results produced by the processing unit 2104.

In some embodiments, the processing unit 2104 can be operatively coupled to a control module 2108 configured to control a state of the movable object. For example, the control module 2108 can be configured to control the propulsion mechanisms of the movable object to adjust the spatial disposition, velocity, and/or acceleration of the movable object with respect to six degrees of freedom. Alternatively or in combination, the control module 2108 can control one or more of a state of a carrier, payload, or sensing module.

The processing unit 2104 can be operatively coupled to a communication module 2110 configured to transmit and/or receive data from one or more external devices (e.g., a terminal, display device, or other remote controller). Any suitable means of communication can be used, such as wired communication or wireless communication. For example, the communication module 2110 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 2110 can transmit and/or receive one or more of sensing data from the sensing module 2102, processing results produced by the processing unit 2104, predetermined control data, user commands from a terminal or remote controller, and the like.

The components of the system 2100 can be arranged in any suitable configuration. For example, one or more of the components of the system 2100 can be located on the movable object, carrier, payload, terminal, sensing system, or an additional external device in communication with one or more of the above. Additionally, although FIG. 21 depicts a single processing unit 2104 and a single non-transitory computer readable medium 2106, one of skill in the art would appreciate that this is not intended to be limiting, and that the system 2100 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 2100 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A computer-implemented method for controlling an unmanned aerial vehicle (UAV), comprising:
   identifying a set of target markers based on a plurality of images captured by an imaging device carried by the UAV, the set of target markers including at least two or more types of target markers and being in close proximity to be detected within a same field of view of the imaging device, and the set of target markers including a security marker configured to convey authentication information;
   determining a spatial relationship between the UAV and the set of target markers based at least in part on the plurality of images; and
   controlling the UAV to approach the set of target markers based at least in part on the spatial relationship while controlling the imaging device to track the set of target markers such that the set of target markers remains within the same field of view of the imaging device.

2. The method of claim 1, wherein the two or more types of target markers further include at least one of a landing marker indicating a location for the UAV to land, or a heading marker indicating a heading for the UAV when landed.

3. The method of claim 2, further comprising:
   controlling the UAV to align its heading to the heading marker prior to landing the UAV.

4. The method of claim 1, further comprising:
   authenticating the set of target markers, or an entity or a provider of the set of target markers based on the security marker prior to landing the UAV.

5. The method of claim 1, wherein the authentication information includes at least one of credentials, security identifiers, or one-dimensional or two-dimensional barcodes or tags.

6. The method of claim 1, wherein the set of target markers comprises one or more concentric features.

7. The method of claim 1, wherein identifying the set of target markers comprises:
   identifying one or more features in the plurality of images;
   associating the one or more features with one or more sets of candidate markers;
   assigning one or more weights to the one or more sets of candidate markers, respectively, each weight indicating a likelihood that a set of candidate markers is associated with the set of target markers; and
   selecting the set of target markers from the one or more sets of candidate markers based at least in part on the one or more weights of the one or more sets of candidate markers.

8. The method of claim 7, wherein associating the one or more features with the one or more sets of candidate markers comprises:
   comparing a first feature of the one or more features in a first image of the plurality of images with a second feature of the one or more features in a second image of the plurality of images based on one or more feature attributes; and
   determining whether the first feature and the second feature correspond to a same one of the one or more sets of candidate markers based on the comparison.

9. The method of claim 8, wherein the one or more feature attributes comprise at least one of a size, a perspective, or a center distance.

10. The method of claim 7, wherein the one or more features include a plurality of features, and assigning the one or more weights to the one or more sets of candidate markers is based at least in part on:
    relative sizes of the plurality of features, or
    whether the plurality of features are concentric.

11. The method of claim 1, wherein determining the spatial relationship between the UAV and the set of target markers comprises:
    determining, based at least in part on the plurality of images, first positions of the set of target markers in a camera coordinate system; and
    transforming the first positions of the set of target markers in the camera coordinate system to second positions of the set of target markers in a UAV coordinate system based at least in part on a spatial relationship between the imaging device and the UAV.

12. The method of claim 1, wherein the spatial relationship between the UAV and the set of target markers comprises horizontal distances and vertical distances, and controlling the UAV to approach the set of target markers based on the spatial relationship comprises:
generating one or more horizontal control commands for the UAV to reduce the horizontal distances between the UAV and the set of target markers based at least in part on the horizontal distances; and
generating one or more vertical control commands for the UAV to reduce the vertical distances based at least in part on the horizontal distances.

13. The method 12, wherein the one or more horizontal control commands are used to control a horizontal velocity of the UAV, and the one or more vertical control commands are used to control a vertical velocity of the UAV.

14. The method of claim 13, wherein the vertical velocity of the UAV is negatively correlated to the horizontal distances between the UAV and the set of target markers.

15. One or more non-transitory computer-readable storage media storing computer-executable instructions that, when executed by a computing system, configure the computing system to perform operations comprising:
identifying a set of target markers based on a plurality of images captured by an imaging device carried by the UAV, the set of target markers including at least two or more types of target markers and being in close proximity to be detected within a same field of view of the imaging device, and the set of target markers including a security marker configured to convey authentication information;
determining a spatial relationship between the UAV and the set of target markers based at least in part on the plurality of images; and
controlling the UAV to approach the set of target markers based at least in part on the spatial relationship while controlling the imaging device to track the set of target markers such that the set of target markers remains within the same field of view of the imaging device.

16. The one or more non-transitory computer-readable storage media of claim 15, wherein the two or more types of target markers further include at least one of a landing marker indicating a location for the UAV to land, or a heading marker indicating a heading for the UAV when landed.

17. The one or more non-transitory computer-readable storage media of claim 16, when executed by the computing system, further configure the computing system to perform operations comprising:
controlling the UAV to align its heading to the heading marker prior to landing the UAV.

18. The one or more non-transitory computer-readable storage media of claim 15, when executed by the computing system, further configure the computing system to perform operations comprising:
authenticating the set of target markers, or an entity or a provider of the set of target markers based on the security marker prior to landing the UAV.

19. An unmanned aerial vehicle (UAV), comprising:
a memory that stores one or more computer-executable instructions; and
one or more processors configured to access the memory and execute the computer-executable instructions to perform operations comprising:
identifying a set of target markers based on a plurality of images captured by an imaging device carried by the UAV, the set of target markers including at least two or more types of target markers and being in close proximity to be detected within a same field of view of the imaging device, and the set of target markers including a security marker configured to convey authentication information;
determining a spatial relationship between the UAV and the set of target markers based at least in part on the plurality of images; and
controlling the UAV to approach the set of target markers based at least in part on the spatial relationship while controlling the imaging device to track the set of target markers such that the set of target markers remains within the same field of view of the imaging device.

20. The UAV of claim 19, wherein the two or more types of target markers further include at least one of a landing marker indicating a location for the UAV to land, or a heading marker indicating a heading for the UAV when landed.

* * * * *